United States Patent
Zhou

(10) Patent No.: US 12,156,077 B2
(45) Date of Patent: Nov. 26, 2024

(54) PACKET FLOW DESCRIPTION INFORMATION DEPLOYMENT MANAGEMENT METHOD, DEVICE, AND SYSTEM

(71) Applicant: HUAWEI TECHNOLOGIES CO., LTD., Guangdong (CN)

(72) Inventor: Xiaoyun Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 17/535,672

(22) Filed: Nov. 25, 2021

(65) Prior Publication Data

US 2022/0086693 A1     Mar. 17, 2022

Related U.S. Application Data

(63) Continuation of application No. PCT/CN2020/076198, filed on Feb. 21, 2020.

(30) Foreign Application Priority Data

May 31, 2019    (CN) .......................... 201910472550.6

(51) Int. Cl.
*H04W 28/00* (2009.01)
*H04W 28/12* (2009.01)

(52) U.S. Cl.
CPC .................................. *H04W 28/12* (2013.01)

(58) Field of Classification Search
None
See application file for complete search history.

(56) References Cited

U.S. PATENT DOCUMENTS

| 2015/0223104 A1 | 8/2015 | Xu |
| 2018/0069798 A1 | 3/2018 | Bacik et al. |
| 2019/0098536 A1* | 3/2019 | Qiao .................. H04W 36/326 |

FOREIGN PATENT DOCUMENTS

| CN | 101945436 A | 1/2011 |
| CN | 108064032 A | 5/2018 |
| CN | 108419270 A | 8/2018 |
| CN | 110138668 A | 8/2019 |
| JP | 2015156712 A | 8/2015 |

(Continued)

OTHER PUBLICATIONS

3GPP TSG-CT WG3 Meeting #103, C3-192346.*

(Continued)

*Primary Examiner* — Abdelillah Elmejjarmi
(74) *Attorney, Agent, or Firm* — HUAWEI TECHNOLOGIES CO., LTD.

(57) ABSTRACT

In a packet flow description information management method, a network exposure function network element determines that packet flow description (PFD) information fails to be deployed on a user plane function network element. The network exposure function network element then sends a first message that includes first indication information, an application ID corresponding to the PFD information, and first information of the user plane function network element. The first information of the user plane function network element identifies the user plane function network element, and the first indication information indicates that the PFD information fails to be deployed.

14 Claims, 15 Drawing Sheets

(56) References Cited

FOREIGN PATENT DOCUMENTS

| WO | 2017125698 | A1 | 7/2017 |
|---|---|---|---|
| WO | 2018064826 | A1 | 4/2018 |
| WO | 2018082707 | A1 | 5/2018 |
| WO | 2019184680 | A1 | 10/2019 |

OTHER PUBLICATIONS

Ericsson, "[Change Request] PFD management notification", 3GPP TSG-CT WG3 Meeting #103 C3-192345, [online], May 13-17, 2019, Total 4 Pages.

3GPP TS 23.503 V16.0.0 (Mar. 2019), 3rd Generation Partnership Project; Technical Specification Group Services and System Aspects; Policy and Charging Control Framework for the 5G System; Stage 2(Release 16), 10 pages.

3GPP TS 29.522 v16.0.0 (May 2019), 3rd Generation Partnership Project; Technical Specification Group Core Network and Terminals; 5G System; Network Exposure Function Northbound APIs; Stage 3 (Release 15), 42 pages.

3GPP IS 23.503 V15.3.0 (Sep. 2018), 3rd Generation Partnership Project; Technical Specification Group Services and System Aspects; Policy and Charging Control Frameworkfor the 5G System; Stage 2(Release 15), 70 pages.

Ericsson, "PFD management notification", 3GPP TSG-CT WG3 Meeting #103 C3-192346, Reno, USA, May 13-17, 2019, Total 11 Pages.

3GPP TS 29.522 V15.3.0 (Mar. 2019); 3rd Generation Partnership Project; Technical Specification Group Core Network and Terminals; 5G System; Network Exposure Function Northbound APIs;Stage 3(Release 15),total 32 pages.

3GPP TS 29.122 V16.1.0 (Mar. 2019); 3rd Generation Partnership Project; Technical Specification Group Core Network and Terminals; T8 reference point for Northbound APIs;(Release 16),total 288 pages.

3GPP TS 29.504 V15.3.0 (Mar. 2019); 3rd Generation Partnership Project; Technical Specification Group Core Network and Terminals; 5G System; Unified Data Repository Services;Stage 3(Release 15),total 26 pages.

3GPP TS 23.682 V16.2.0 (Mar. 2019); 3rd Generation Partnership Project; Technical Specification Group Services and System Aspects;Architecture enhancements to facilitate communications with packet data networks and applications (Release 16),total 126 pages.

3GPP TS 29.251 V16.0.0 (Mar. 2019); 3rd Generation Partnership Project; Technical Specification Group Core Network and Terminals; Gw and Gwn reference point for sponsored data connectivity(Release 16),total 36 pages.

3GPP TS 29.250 V16.0.0 (Mar. 2019); 3rd Generation Partnership Project; Technical Specification Group Core Network and Terminals; Nu reference point between SCEF and PFDF for sponsored data connectivity(Release 16),total 23 pages.

ZTE,"PFD status report", 3GPP TSG-CT WG3 Meeting #90 C3-173103,Zhangjiajie, China, May 15-19, 2017,total 13 pages.

* cited by examiner

PACKET FLOW DESCRIPTION INFORMATION DEPLOYMENT MANAGEMENT METHOD, DEVICE, AND SYSTEM

CROSS-REFERENCE TO RELATED APPLICATIONS

This application is a continuation of Application No. PCT/CN2020/076198, filed on Feb. 21, 2020, which claims priority to Chinese Patent Application No. 201910472550.6, filed on May 31, 2019. The disclosures of the aforementioned applications are hereby incorporated by reference in their entirety.

TECHNICAL FIELD

This application relates to the field of communications technologies, and in particular, to a packet flow description (PFD) information management deployment method, a device, and a system.

BACKGROUND

In the prior art, an application detection filter may be configured by using a network management system of an operator, or may be managed by a third-party application server. For example, in a non-separation policy and charging control (PCC) architecture of a 4th generation (4G) network control plane/user plane (C/U), a third-party application server (for example, a service capability server (SCS) or an application server (AS)) respectively provides PFD information for a service capability exposure function (SCEF) network element and a packet flow description function (PFDF) network element, to update an application detection filter corresponding to an application ID configured on a policy and charging enforcement function (PCEF) network element.

However, on the one hand, there may be a plurality of PFDF network elements in one network. Because of a communication fault or a network device fault, the SCEF network element may not be able to send the PFD information to all PCEF network elements within a specified period of time by using all the PFDF network elements. On the other hand, even if the PFD information is successfully deployed on the PCEF network element, the PFD information may become invalid or incorrect for some reasons.

In the prior art, the third-party application server receives only a response indicating that all PFD information is successfully deployed or none of PFD information is successfully deployed, but cannot learn of a case in which PFD information fails to be deployed at all applicable PCEF (for the case in which the portion of PFD information fails to be deployed, currently the application server receives only a response message indicating that the portion of PFD information fails to be deployed). On a PCEF network element on which the PFD information fails to be deployed, the PCEF network element cannot detect data corresponding to an application.

Therefore, specific policy and charging control cannot be performed on the data. However, the application server does not know that the PFD information is not successfully deployed on the PCEF network element. Therefore, the application server may execute a third-party specific policy on the data. For example, a media website charges users higher fees for some HD videos. In addition, the media website collaborates with the operator to ensure high bandwidth for these HD videos. However, because the PFD information is not successfully deployed, the network does not provide a high bandwidth guarantee for service data, thereby affecting user experience.

The foregoing problems also exist in a 4G network C/U separation PCC architecture, or in a 5th generation (5G) network architecture. Therefore, how to enable the third-party application server to learn of information about a core network device on which the PFD information is not successfully deployed, so that the application server executes a corresponding policy on a service accessed by using these core network devices. The core network device is, for example, the PCEF network element in the 4G network C/U non-separation PCC architecture, a packet data network gateway-user plane (PGW-U) network element in the 4G network C/U separation PCC architecture, or a user plane function (UPF) network element in a 5G network. Thus, how to enable the third-party application server to learn of information about the core network device is a problem that needs to be urgently resolved currently.

SUMMARY

Embodiments of this application provide a PFD information management method, a device, and a system, so that a third-party application server can learn of information about a core network device on which PFD information is not successfully deployed.

To achieve the foregoing objective, the following technical solutions are used in the embodiments of this application:

According to a first aspect, a packet flow description PFD information management method is provided. The method includes: determining, by a first network element, that PFD information fails to be deployed on a second network element; and sending, by the first network element, a first message to a third network element, where the first message includes first indication information, an application ID corresponding to the PFD information, and first information of the second network element; the first information of the second network element is used to identify the second network element, and the first indication information indicates that the PFD information fails to be deployed. The third network element may be, for example, an application server or a network device that can communicate with an application server. In this case, the application server can learn of information about the second network element on which the PFD information is not successfully deployed (for example, a PCEF network element in a 4G network C/U non-separation PCC architecture, a PGW-U network element in a 4G network C/U separation PCC architecture, or a UPF network element in a 5G network), so that the application server may execute a corresponding policy on a service accessed by using the second network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

Optionally, in the embodiments of this application, that the PFD information fails to be deployed on the second network element means that the PFD information fails to be installed, modified, or deleted on the second network element; and that the PFD information is successfully deployed on the second network element means that the PFD information is successfully installed, modified, or deleted on the second network element. A general description is provided herein, and details are not described below.

In a possible design, the first message further includes one or both of a cause value of a deployment failure of the PFD information or a PFD identifier corresponding to the PFD information that cannot be successfully deployed.

In a possible design, the first network element includes a packet flow description function network element, the second network element includes a policy and charging enforcement function network element or a service detection function network element, and the third network element includes a service capability exposure function network element.

In a possible design, the determining, by a first network element, that PFD information fails to be deployed on a second network element includes: determining, by the first network element, that the PFD information cannot be sent to the second network element within a configured period of time; or determining, by the first network element, that the PFD information cannot be sent to the second network element within an allowed delay, where the allowed delay is duration of completing deployment of the PFD information; or receiving, by the first network element, a second message, where the second message includes the first indication information and the application ID. According to this solution, the first network element may determine that the PFD information fails to be deployed on the second network element.

In a possible design, the first network element includes a packet flow description function network element, the second network element includes a packet gateway user plane network element, and the third network element includes a service capability exposure function network element.

In a possible design, the determining, by a first network element, that PFD information fails to be deployed on a second network element includes: determining, by the first network element, that the PFD information cannot be sent to a packet gateway control plane network element within a configured period of time; or determining, by the first network element, that the PFD information cannot be sent to the packet gateway control plane network element within an allowed delay, where the allowed delay is duration of completing deployment of the PFD information; or receiving, by the first network element, a second message, where the second message includes the first indication information, the application ID, and the first information of the second network element. According to this solution, the first network element may determine that the PFD information fails to be deployed on the second network element.

In a possible design, the first network element includes a network exposure function network element, the second network element includes a user plane function network element, and the third network element includes an application server.

In a possible design, the determining, by a first network element, that PFD information fails to be deployed on a second network element includes: determining, by the first network element, that the PFD information cannot be sent to a session management network element within a configured period of time; or determining, by the first network element, that the PFD information cannot be sent to the session management network element within an allowed delay, where the allowed delay is duration of completing deployment of the PFD information; or receiving, by the first network element, a second message, where the second message includes the first indication information, the application ID, and second information of the second network element. According to this solution, the first network element may determine that the PFD information fails to be deployed on the second network element.

In a possible design, the first network element includes a service capability exposure function network element, the second network element includes a policy and charging enforcement function network element or a service detection function network element, and the third network element includes an application server; or the first network element includes a service capability exposure function network element, the second network element includes a packet gateway user plane network element, and the third network element includes an application server.

In a possible design, the determining, by a first network element, that PFD information fails to be deployed on a second network element includes: determining, by the first network element, that the PFD information cannot be sent to a packet flow description function network element within a configured period of time; or determining, by the first network element, that the PFD information cannot be sent to the packet flow description function network element within an allowed delay, where the allowed delay is duration of completing deployment of the PFD information; or receiving, by the first network element, a second message, where the second message includes the first indication information, the application ID, and second information of the second network element. According to this solution, the first network element may determine that the PFD information fails to be deployed on the second network element.

In a possible design, the first network element includes a packet gateway control plane network element, the second network element includes a packet gateway user plane network element, and the third network element includes a packet flow description function network element; or the first network element includes a session management network element, the second network element includes a user plane function network element, and the third network element includes a network exposure function network element.

In a possible design, the determining, by a first network element, that PFD information fails to be deployed on a second network element includes: determining, by the first network element, that the PFD information cannot be sent to the second network element within a configured period of time; or determining, by the first network element, that the PFD information cannot be sent to the second network element within an allowed delay, where the allowed delay is duration of completing deployment of the PFD information; or receiving, by the first network element, a second message, where the second message includes the first indication information, the application ID, and the first information of the second network element. According to this solution, the first network element may determine that the PFD information fails to be deployed on the second network element.

In a possible design, after the sending, by the first network element, a first message, the method further includes: determining, by the first network element, that the PFD information is successfully deployed on the second network element; and sending, by the first network element, a third message to the third network element, where the third message includes second indication information and the application ID corresponding to the PFD information, and the second indication information indicates that the PFD information is successfully deployed. The third network element may be, for example, an application server or a network device that can communicate with an application server. Optionally, the third message may further include the first information of the second network element. According to this solution, the application server can learn of information about the second network element on which the PFD information is successfully deployed, so that the application server may execute a corresponding policy on a service accessed by using the second network element. For example, user fees are increased, and HD videos are played, thereby improving user experience.

In a possible design, the determining, by the first network element, that the PFD information is successfully deployed on the second network element includes: receiving, by the first network element, a fourth message, where the fourth message includes the second indication information, the application ID, and the first information of the second network element. Based on the fourth message, the first network element may determine that the PFD information is successfully deployed on the second network element.

In a possible design, the second message further includes one or both of a cause value of a deployment failure of the PFD information or a PFD identifier corresponding to the PFD information that cannot be successfully deployed.

In a possible design, the third message further includes a PFD identifier corresponding to the successfully deployed PFD information.

In a possible design, the first information of the second network element includes: one or more of address range information corresponding to the second network element allocated to a terminal device, a routing area or tracking area identifier corresponding to the second network element, a cell identifier corresponding to the second network element, an identifier of the second network element, an identifier of an access device corresponding to the second network element, a data network access identifier corresponding to the second network element, a geographic location corresponding to the second network element, or a municipal address corresponding to the second network element.

In a possible design, the second information of the second network element includes: one or more of address range information corresponding to the second network element allocated to a terminal device, a routing area or tracking area identifier corresponding to the second network element, a cell identifier corresponding to the second network element, an identifier of the second network element, an identifier of an access device corresponding to the second network element, or a data network access identifier corresponding to the second network element.

According to a second aspect, a communications apparatus is provided, configured to implement the foregoing method. The communications apparatus may be the first network element in the first aspect, or an apparatus including the first network element. The communications apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a third aspect, a communications apparatus is provided, including a processor and a memory. The memory is configured to store a computer instruction, and when the processor executes the instruction, the communications apparatus is enabled to perform the method according to any one of the foregoing aspects. The communications apparatus may be the first network element in the first aspect, or an apparatus including the first network element.

According to a fourth aspect, a communications apparatus is provided, including a processor. The processor is configured to: after being coupled to a memory and reading an instruction in the memory, perform, according to the instruction, the method according to any one of the foregoing aspects. The communications apparatus may be the first network element in the first aspect, or an apparatus including the first network element.

According to a fifth aspect, a computer-readable storage medium is provided. The computer-readable storage medium stores an instruction, and when the instruction is run on a computer, the computer is enabled to perform the method according to any one of the foregoing aspects.

According to a sixth aspect, a computer program product including an instruction is provided. When the computer program product runs on a computer, the computer is enabled to perform the method according to any one of the foregoing aspects.

According to a seventh aspect, a communications apparatus (for example, the communications apparatus may be a chip or a chip system) is provided. The communications apparatus includes a processor, configured to implement the function in any one of the foregoing aspects. In a possible design, the communications apparatus further includes a memory. The memory is configured to store a necessary program instruction and necessary data. When the communications apparatus is a chip system, the chip system may include a chip, or may include a chip and another discrete device.

For technical effects brought by any design manner of the second aspect to the seventh aspect, refer to technical effects brought by different design manners of the first aspect. Details are not described herein again.

According to an eighth aspect, a communication method is provided. The communication method includes: sending, by a first network element, a first message to a third network element after determining that PFD information fails to be deployed on a second network element, where the first message includes first indication information, an application ID corresponding to the PFD information, and first information of the second network element; the first information of the second network element is used to identify the second network element, and the first indication information indicates that the PFD information fails to be deployed; and receiving, by the third network element, the first message from the first network element.

In a possible design, the first network element includes a packet flow description function network element, the second network element includes a policy and charging enforcement function network element or a service detection function network element, and the third network element includes a service capability exposure function network element.

In a possible design, the first network element includes a packet flow description function network element, the second network element includes a packet gateway user plane network element, and the third network element includes a service capability exposure function network element.

In a possible design, the first network element includes a session management network element, the second network element includes a user plane function network element, and the third network element includes a network exposure function network element.

In a possible design, the communication method further includes: sending, by the third network element, a fifth message to an application server, where the fifth message includes the first indication information, the application ID corresponding to the PFD information, and second information of the second network element, and the second information of the second network element is used to identify the second network element; and receiving, by the application server, the fifth message from the third network element.

In a possible design, the first network element includes a service capability exposure function network element, the second network element includes a policy and charging enforcement function network element or a service detection function network element, and the third network element includes an application server.

In a possible design, the first network element includes a service capability exposure function network element, the second network element includes a packet gateway user plane network element, and the third network element includes an application server.

In a possible design, the first network element includes a network exposure function network element, the second network element includes a user plane function network element, and the third network element includes an application server.

In a possible design, the first network element includes a packet gateway control plane network element, the second network element includes a packet gateway user plane network element, and the third network element includes a packet flow description function network element.

In a possible design, the communication method further includes: sending, by the third network element, a sixth message to the service capability exposure function network element, where the sixth message includes the first indication information, the application ID corresponding to the PFD information, and the first information of the second network element; receiving, by the service capability exposure function network element, the sixth message from the third network element, and sending a fifth message to the application server, where the fifth message includes the first indication information, the application ID corresponding to the PFD information, and second information of the second network element, and the second information of the second network element is used to identify the second network element; and receiving, by the application server, the fifth message from the service capability exposure function network element.

For technical effects brought by any design manner of the eighth aspect, refer to technical effects brought by different design manners of the first aspect. Details are not described herein again.

According to a ninth aspect, a communications system is provided. The communications system includes a first network element and a third network element; the first network element is configured to send a first message to the third network element after determining that PFD information fails to be deployed on a second network element, where the first message includes first indication information, an application ID corresponding to the PFD information, and first information of the second network element; the first information of the second network element is used to identify the second network element, and the first indication information indicates that the PFD information fails to be deployed; and the third network element is configured to receive the first message from the first network element.

In a possible design, the first network element includes a packet flow description function network element, the second network element includes a policy and charging enforcement function network element or a service detection function network element, and the third network element includes a service capability exposure function network element.

In a possible design, the first network element includes a packet flow description function network element, the second network element includes a packet gateway user plane network element, and the third network element includes a service capability exposure function network element.

In a possible design, the first network element includes a session management network element, the second network element includes a user plane function network element, and the third network element includes a network exposure function network element.

In a possible design, the communications system further includes an application server; the third network element is further configured to send a fifth message to the application server, where the fifth message includes the first indication information, the application ID corresponding to the PFD information, and second information of the second network element, and the second information of the second network element is used to identify the second network element; and the application server is further configured to receive the fifth message from the third network element.

In a possible design, the first network element includes a service capability exposure function network element, the second network element includes a policy and charging enforcement function network element or a service detection function network element, and the third network element includes an application server.

In a possible design, the first network element includes a service capability exposure function network element, the second network element includes a packet gateway user plane network element, and the third network element includes an application server.

In a possible design, the first network element includes a network exposure function network element, the second network element includes a user plane function network element, and the third network element includes an application server.

In a possible design, the first network element includes a packet gateway control plane network element, the second network element includes a packet gateway user plane network element, and the third network element includes a packet flow description function network element.

In a possible design, the communications system further includes a service capability exposure function network element and an application server; the third network element is further configured to send a sixth message to the service capability exposure function network element, where the sixth message includes the first indication information, the application ID corresponding to the PFD information, and the first information of the second network element; the service capability exposure function network element is further configured to: receive the sixth message from the third network element, and send a fifth message to the application server, where the fifth message includes the first indication information, the application ID corresponding to the PFD information, and second information of the second network element, and the second information of the second network element is used to identify the second network element; and the application server is further configured to receive the fifth message from the service capability exposure function network element.

For technical effects brought by any design manner of the ninth aspect, refer to technical effects brought by different design manners of the first aspect. Details are not described herein again.

DESCRIPTION OF EMBODIMENTS

The following describes the technical solutions in the embodiments of this application with reference to the accompanying drawings in the embodiments of this application. In the description of this application, "/" represents an "or" relationship between associated objects unless otherwise specified. For example, A/B may represent A or B. The term "and/or" in this application indicates only an association relationship for describing associated objects and represents that three relationships may exist. For example, A and/or B may represent the following three cases: Only A exists, both A and B exist, and only B exists, where A and B may be singular or plural. In addition, unless otherwise specified, "a plurality of" in the description of this application means two or more than two. "At least one (one piece) of the following" or a similar expression thereof refers to any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference. In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "for example" or the like is intended to present a relative concept in a specific manner for ease of understanding.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
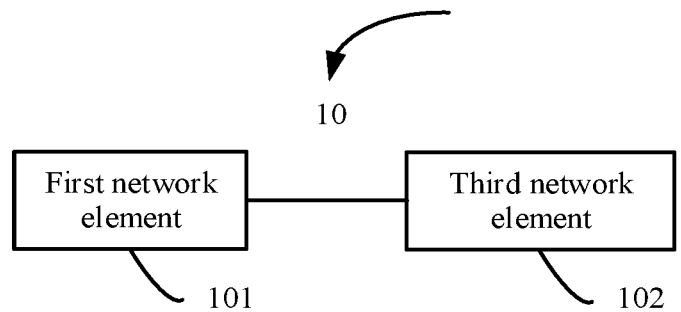
FIG. 1 is a schematic structural diagram of a communications system according to an embodiment of this application.

FIG. 1 shows a communications system 10 according to an embodiment of this application. The communications system 10 includes a first network element 101 and a third network element 102. The first network element 101 and the third network element 102 may directly communicate with each other, or may communicate with each other through forwarding by another device. This is not specifically limited in this embodiment of this application.

The first network element 101 is configured to determine that PFD information fails to be deployed on a second network element. Further, the first network element 101 is configured to send a first message to the third network element 102, where the first message includes first indication information, an application ID corresponding to the PFD information, and first information of the second network element; the first information of the second network element is used to identify the second network element, and the first indication information indicates that the PFD information fails to be deployed. The third network element 102 is configured to receive the first message from the first network element 101. Specific implementation of the solution is described in detail in subsequent method embodiments. Details are not described herein.

According to the communications system, after determining that the PFD information fails to be deployed on the second network element, the first network element may send, to the third network element, the first message that includes the first indication information, the application ID corresponding to the PFD information, and the first information of the second network element. The first information of the second network element is used to identify the second network element, and the third network element may be, for example, an application server or a network device that can communicate with an application server. In this case, the application server can learn of information about the second network element on which the PFD information is not successfully deployed (for example, a PCEF network element in a 4G network C/U non-separation PCC architecture, a PGW-U network element in a 4G network C/U separation PCC architecture, or a UPF network element in a 5G network), so that the application server may execute a corresponding policy on a service accessed by using the second network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

Optionally, the communications system 10 shown in FIG. 1 may be applied to a current 4G network C/U non-separation PCC architecture, a current 4G network C/U separation PCC architecture, a current 5G network, another future network, or the like. This is not specifically limited in this embodiment of this application.

Figure 2:
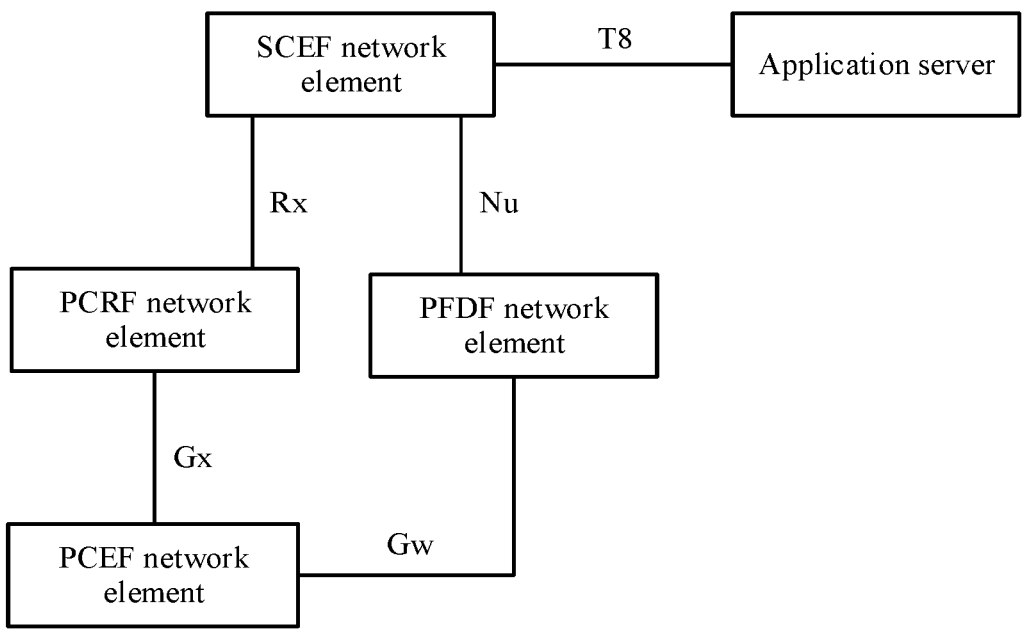
FIG. 2 is a schematic diagram of an existing 4G network C/U non-separation PCC architecture.

For example, assuming that the communications system 10 shown in FIG. 1 is applied to the current 4G network C/U non-separation PCC architecture, as shown in FIG. 2, a network element or an entity corresponding to the second network element may be a PCEF network element in the 4G network C/U non-separation PCC architecture, a network element or an entity corresponding to the first network element may be a PFDF network element in the 4G network C/U non-separation PCC architecture, and a network element or an entity corresponding to the third network element may be an SCEF network element in the 4G network C/U non-separation PCC architecture. Alternatively, a network element or an entity corresponding to the second network element may be a PCEF network element in the 4G network C/U non-separation PCC architecture, a network element or an entity corresponding to the first network element may be an SCEF network element in the 4G network C/U non-separation PCC architecture, and a network element or an entity corresponding to the third network element may be an application server in the 4G network C/U non-separation PCC architecture. The application server may be, for example, an SCS or an AS. This is not specifically limited in this embodiment of this application.

In addition, as shown in FIG. 2, the 4G network C/U non-separation PCC architecture may further include a policy and charging rule function (PCRF) network element and the like. This is not specifically limited in this embodiment of this application.

As shown in FIG. 2, the PCEF network element communicates with the PCRF network element through a Gx interface, the PCEF network element communicates with the PFDF network element through a Gw interface, the PCRF network element communicates with the SCEF network element through an Rx interface, the PFDF network element communicates with the SCEF network element through an Nu interface, and the SCEF network element communicates with the application server through a T8 interface.

Figure 3:
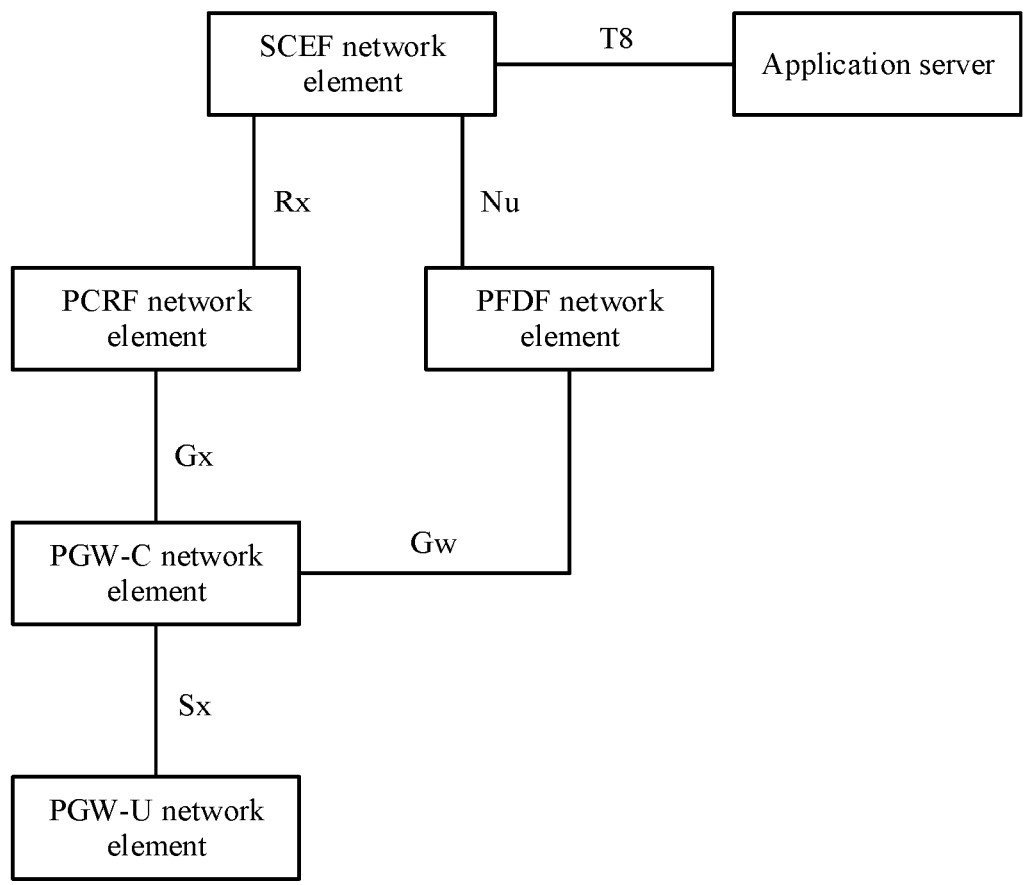
FIG. 3 is a schematic diagram of an existing 4G network C/U separation PCC architecture.

Alternatively, for example, assuming that the communications system 10 shown in FIG. 1 is applied to the current 4G network C/U separation PCC architecture, as shown in FIG. 3, a network element or an entity corresponding to the second network element may be a PGW-U network element in the 4G network C/U separation PCC architecture, a network element or an entity corresponding to the first network element may be a PGW-C network element in the 4G network C/U separation PCC architecture, and a network element or an entity corresponding to the third network element may be a PFDF network element in the 4G network C/U separation PCC architecture. Alternatively, a network element or an entity corresponding to the second network element may be a PGW-U network element in the 4G network C/U separation PCC architecture, a network element or an entity corresponding to the first network element may be a PFDF network element in the 4G network C/U separation PCC architecture, and a network element or an entity corresponding to the third network element may be an SCEF network element in the 4G network C/U separation PCC architecture. Alternatively, a network element or an entity corresponding to the second network element may be a PGW-U network element in the 4G network C/U separation PCC architecture, a network element or an entity corresponding to the first network element may be an SCEF network element in the 4G network C/U separation PCC architecture, and a network element or an entity corresponding to the third network element may be an application server in the 4G network C/U separation PCC architecture. The application server may be, for example, an SCS or an AS. This is not specifically limited in this embodiment of this application.

In addition, as shown in FIG. 3, the 4G network C/U separation PCC architecture may further include a PCRF network element and the like. This is not specifically limited in this embodiment of this application.

As shown in FIG. 3, the PGW-U network element communicates with the PGW-C network element through an Sx interface, the PGW-C network element communicates with the PCRF network element through a Gx interface, the PGW-C network element communicates with the PFDF network element through a Gw interface, the PCRF network element communicates with the SCEF network element through an Rx interface, the PFDF network element communicates with the SCEF network element through an Nu interface, and the SCEF network element communicates with the application server through a T8 interface.

Figure 4:
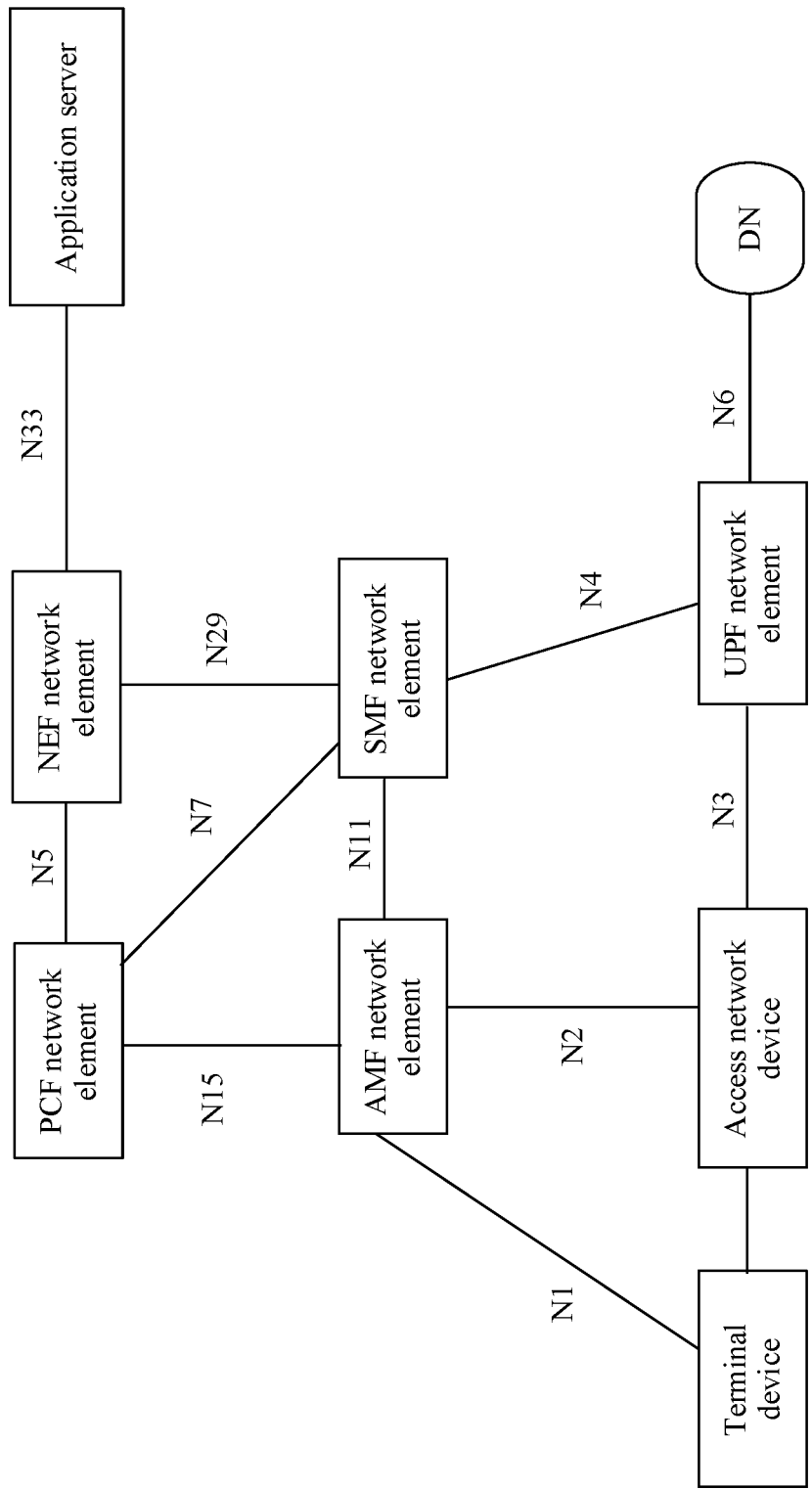
FIG. 4 is a schematic diagram of an existing 5G network architecture.

Alternatively, for example, assuming that the communications system 10 shown in FIG. 1 is applied to the current 5G network, as shown in FIG. 4, a network element or an entity corresponding to the second network element may be a UPF network element in the 5G network, a network element or an entity corresponding to the first network element may be a session management function (SMF) network element in the 5G network, and a network element or an entity corresponding to the second network element may be a network exposure function (NEF) network element in the 5G network. Alternatively, a network element or an entity corresponding to the second network element may be a UPF network element in the 5G network, a network element or an entity corresponding to the first network element may be an NEF network element in the 5G network, and a network element or an entity corresponding to the third network element may be an application server in the 5G network. The application server may be, for example, an SCS or an AS. This is not specifically limited in this embodiment of this application.

In addition, as shown in FIG. 4, the 5G network may further include an access and mobility management function (AMF) network element and the like. This is not specifically limited in this embodiment of this application.

As shown in FIG. 4, a terminal device communicates with the AMF network element through a next generation (next generation, N) 1 interface (N1 for short), an access network device communicates with the AMF network element through an N2 interface (N2 for short), the access network device communicates with the UPF network element through an N3 interface (N3 for short), the UPF network element communicates with a DN through an N6 interface (N6 for short), the AMF network element communicates with the SMF network element through an N11 interface (N11 for short), the SMF network element communicates with the NEF network element through an N29 interface (N29 for short), and the NEF network element communicates with the application server through an N33 interface (N33 for short).

Optionally, a related function of the first network element in this embodiment of this application may be implemented by one device, or may be jointly implemented by a plurality of devices, or may be implemented by one or more functional modules in one device. This is not specifically limited in this embodiment of this application. It can be understood that the foregoing function may be a function of a network element on a hardware device, or may be a function of software function run on dedicated hardware, or may be a function of a combination of hardware and software, or may be a virtualization function instantiated on a platform (for example, a cloud platform).

Figure 5:
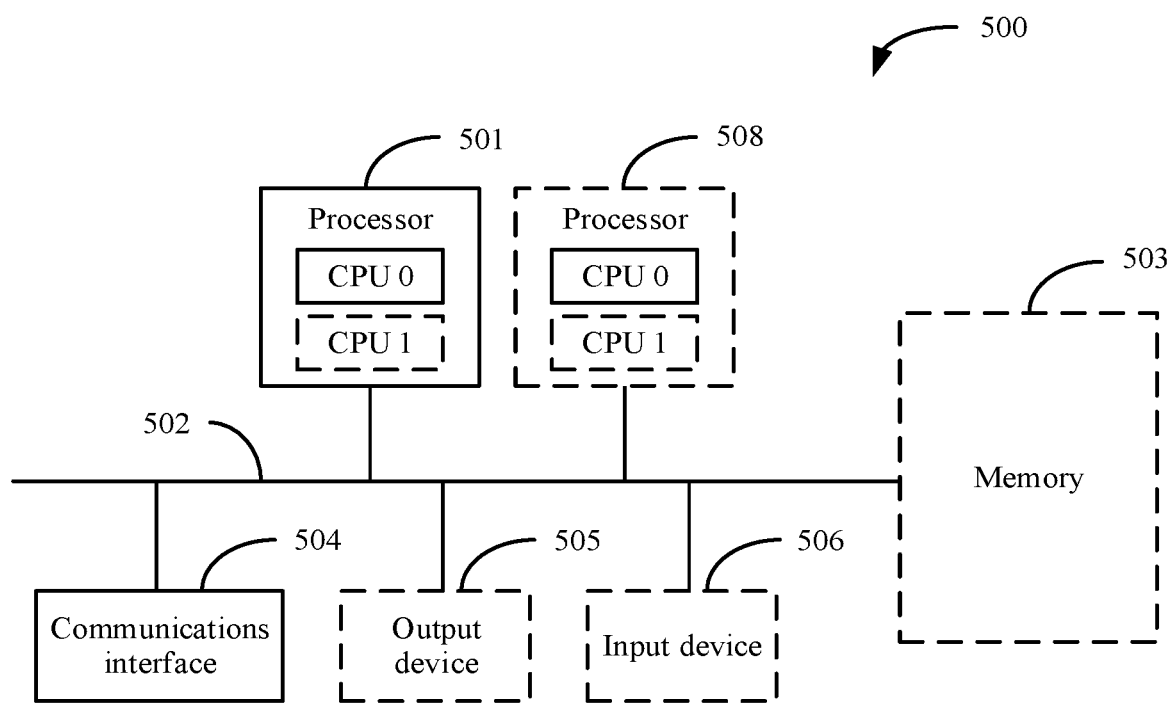
FIG. 5 is a schematic structural diagram of a communications device according to an embodiment of this application.

For example, the related function of the first network element in this embodiment of this application may be implemented by a communications device 500 in FIG. 5. FIG. 5 is a schematic structural diagram of the communications device 500 according to an embodiment of this application. The communications device 500 includes one or more processors 501, a communication line 502, and at least one communications interface (FIG. 5 uses only an example in which a communications interface 504 and one processor 501 are included for description). Optionally, the communications device 500 may further include a memory 503.

The processor 501 may be a general-purpose central processing unit (CPU), a microprocessor, an application-specific integrated circuit (ASIC), or one or more integrated circuits configured to control program execution of the solutions of this application.

The communication line 502 may include a channel, and is configured to connect different components.

The communications interface 504 may be a transceiver module configured to communicate with another device or a communications network such as the Ethernet, a RAN, or a wireless local area network (WLAN). For example, the transceiver module may be an apparatus such as a transceiver or a transceiver device. Optionally, the communications interface 504 may alternatively be a transceiver circuit located inside the processor 501, and is configured to implement signal input and signal output of the processor.

The memory 503 may be an apparatus having a storage function. For example, the memory 503 may be a read-only memory (ROM) or another type of static storage device that can store static information and an instruction, or a random access memory (RAM) or another type of dynamic storage device that can store information and an instruction. The memory 503 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor by using the communication line 502. The memory may alternatively be integrated with the processor.

The memory 503 is configured to store a computer-executable instruction for executing the solutions of this application, and the processor 501 controls the execution of the computer-executable instruction. The processor 501 is configured to execute the computer-executable instruction stored in the memory 503, to implement the method for determining a service transmission requirement provided in this embodiment of this application.

Alternatively, optionally, in this embodiment of this application, the processor 501 may perform related processing functions in the method for determining a service transmission requirement provided in the following embodiment of this application. The communications interface 504 is responsible for communicating with another device or a communications network.

This is not specifically limited in this embodiment of this application.

Optionally, the computer-executable instruction in this embodiment of this application may also be referred to as application program code. This is not specifically limited in this embodiment of this application.

During specific implementation, in an embodiment, the processor 501 may include one or more CPUs, such as a CPU 0 and a CPU 1 in FIG. 5.

During specific implementation, in an embodiment, the communications device 500 may include a plurality of processors, for example, the processor 501 and a processor 508 in FIG. 5. Each of the processors may be a single-core (single-CPU) processor or a multi-core (multi-CPU) processor. The processor herein may refer to one or more devices, circuits, and/or processing cores configured to process data (for example, a computer program instruction).

During specific implementation, in an embodiment, the communications device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, or a projector (projector). The input device 506 communicates with the processor 501, and may receive an input of a user in a plurality of manners. For example, the input device 506 may be a mouse, a keyboard, a touchscreen device, or a sensor device.

Sometimes the communications device 500 may also be referred to as a communications apparatus, and may be a general-purpose device or a dedicated device. For example, the communications device 500 may be a desktop computer, a portable computer, a network server, a palmtop computer (PDA), a mobile phone, a tablet computer, a wireless terminal device, an embedded device, the foregoing terminal device, the foregoing network device, or a device having a structure similar to a structure shown in FIG. 5. A type of the communications device 500 is not limited in this embodiment of this application.

The following describes in detail the PFD information management method provided in the embodiments of this application with reference to FIG. 1 to FIG. 5.

It should be noted that in the following embodiments of this application, names of messages between network elements, names of parameters in messages, or the like are merely examples, and there may be other names during specific implementation. This is not specifically limited in the embodiments of this application.

Figure 6:
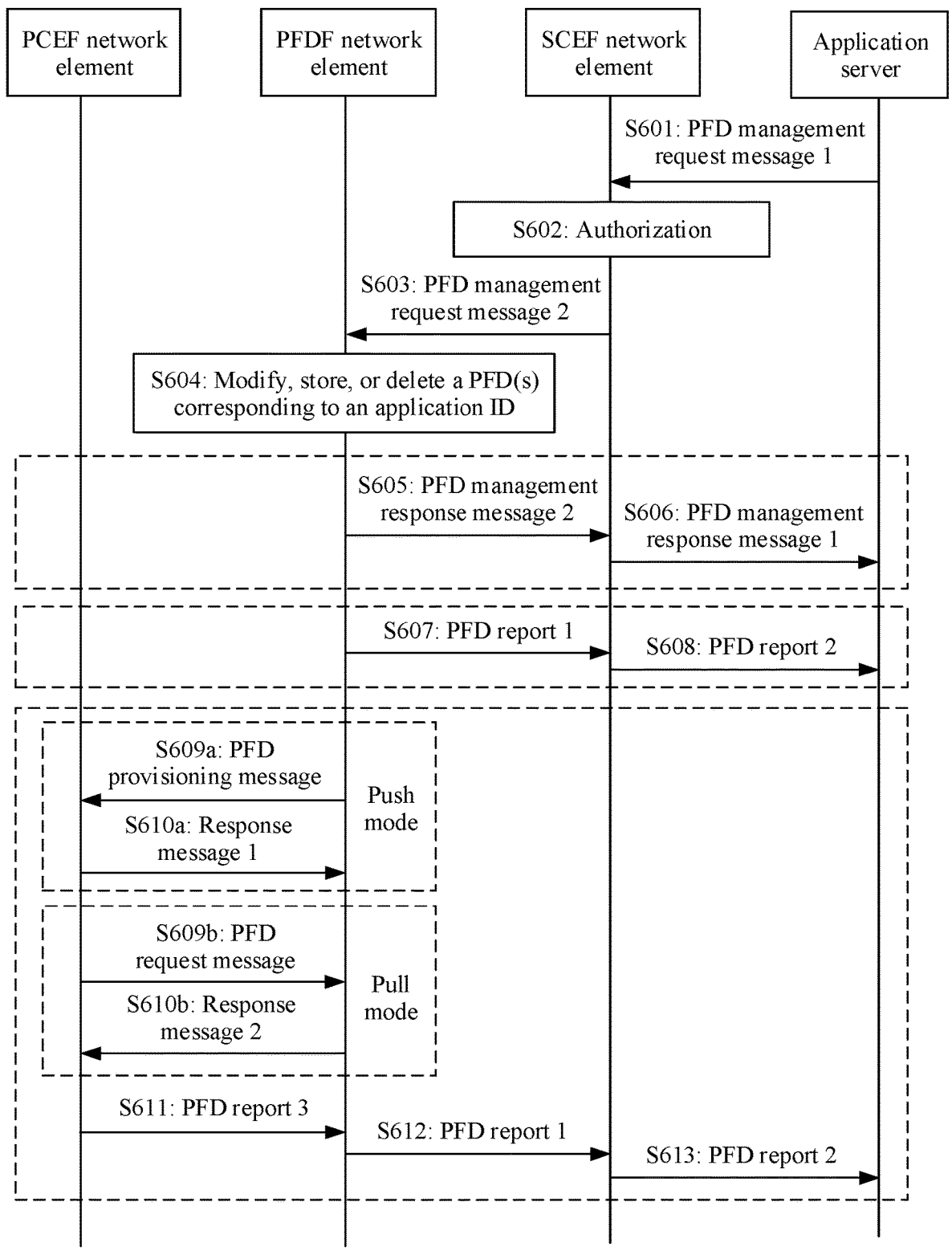
FIG. 6 is a schematic flowchart 1 of a PFD information management method according to an embodiment of this application.

Using an example in which the communications system shown in FIG. 1 is applied to the 4G network C/U non-separation PCC architecture shown in FIG. 2, a first network element is a PFDF network element, a second network element is a PCEF network element, and a third network element is an SCEF network element, as shown in FIG. 6, an embodiment of this application provides a PFD information management method, including the following steps.

S601: An application server sends a PFD management request message 1 to the SCEF network element. The SCEF network element receives the PFD management request message 1 from the application server.

The PFD management request message 1 carries an external application ID and PFD information. The PFD information includes PFD operations and a PFD. The PFD operations include creation, modification, and deletion. The PFD includes a PFD identifier and PFD content. The PFD content includes a triplet (that is, a protocol type, a server-side network protocol (IP) address, and a port number), significant parts (significant parts of URL) of a uniform resource locator (URL), or a domain name and a protocol type. After the application server requests to create one or more PFDs corresponding to one external application ID, the application server may request to delete all PFDs or some PFDs corresponding to the external application ID. In addition, the application server may further request to modify PFD content corresponding to the one or more PFDs.

Optionally, the PFD management request message 1 may further carry an allowed delay, and the allowed delay is duration of completing deployment of the PFD information. If the PFD management request message 1 does not carry the allowed delay, it may indicate that the PFD information is deployed immediately.

S602: The SCEF network element authorizes the PFD management request message 1 of the application server, and after authorization succeeds, the SCEF network element converts the external application ID into a corresponding application ID.

S603: The SCEF network element sends a PFD management request message 2 to the PFDF network element. The PFDF network element receives the PFD management request message 2 from the SCEF network element.

The PFD management request message 2 carries an application ID and PFD information. For related descriptions of the PFD information, refer to step S601. Details are not described herein again.

It should be noted that, in this embodiment of this application, if there are a plurality of PFDF network elements on a network, the SCEF network element may need to send the PFD management request message 2 to the plurality of PFDF network elements. In this embodiment of this application, only an example in which the SCEF network element interacts with one of the PFDF network elements is used for description. This is uniformly described herein, and details are not described in the following.

S604: The PFDF network element creates, modifies, or deletes, according to the PFD management request message 2, a PFD(s) corresponding to the application ID stored in the PFDF network element.

Further, in a possible implementation, the PFD information management method provided in this embodiment of this application further includes the following steps S605 and S606.

S605: If the PFDF network element determines that the PFD information cannot be sent to some PCEF network elements within a configured period of time (for a scenario in which the allowed delay is not carried), the PFDF network element sends a PFD management response message 2 to the SCEF network element, and the SCEF network element receives the PFD management response message 2 from the PFDF network element.

The PFD management response message 2 includes first indication information, an application ID corresponding to the PFD information, and information 1 of a PCEF network element on which the PFD cannot be deployed. The information 1 of the PCEF network element is used to identify the PCEF network element on which the PFD information cannot be deployed, and the first indication information indicates that the PFD information fails to be deployed.

It should be noted that, in this embodiment of this application, that the PFD information fails to be deployed means that the PFD information fails to be installed, modified, or deleted. This is uniformly described herein. The description is applicable to all the embodiments of this application, and details are not described below again.

Optionally, in this embodiment of this application, the information 1 of the PCEF network element may include: one or more of address range information, allocated to a terminal device, corresponding to the PCEF network element (for example, an IP address pool corresponding to the PCEF network element), a routing area identifier (RAI) or a tracking area identifier (TAI) corresponding to the PCEF network element, a cell identifier corresponding to the PCEF network element, an identifier of the PCEF network element, an identifier of an access device corresponding to the PCEF network element, or a data network access identifier (DNAI) corresponding to the PCEF network element.

Optionally, in this embodiment of this application, the PFD management response message 2 may further include one or both of a cause value of a deployment failure of the PFD information or a PFD identifier corresponding to the PFD information that cannot be successfully deployed. The cause value of the deployment failure of the PFD information may be, for example, a communication fault.

S606: The SCEF network element sends a PFD management response message 1 to the application server, and the application server receives the PFD management response message 1 from the SCEF network element.

The PFD management response message 1 includes the first indication information, the application ID corresponding to the PFD information, and information 2 of the PCEF network element on which the PFD cannot be deployed. The information 2 of the PCEF network element is used to identify the PCEF network element on which the PFD information cannot be deployed, and the first indication information indicates that the PFD information fails to be deployed.

Optionally, in this embodiment of this application, the information 2 of the PCEF network element may include: one or more of address range information, allocated to a terminal device, corresponding to the PCEF network element (for example, an IP address pool corresponding to the PCEF network element), a routing area identifier or a tracking area identifier corresponding to the PCEF network element, a cell identifier corresponding to the PCEF network element, an identifier of the PCEF network element, an identifier of an access device corresponding to the PCEF network element, a data network access identifier corresponding to the PCEF network element, a geographic location corresponding to the PCEF network element, or a municipal address corresponding to the PCEF network element.

It should be noted that, for network security, the SCEF network element may not provide the information 1 of the PCEF network element in the 3rd generation partnership project (3GPP) for the application server, but maps the information 1 of the PCEF network element to the data network access identifier corresponding to the PCEF network element, the geographic location corresponding to the PCEF network element, or the municipal address corresponding to the PCEF network element, in the information 2 of the PCEF network element, and provides for the application server. This is uniformly described herein. The description is applicable to all the embodiments of this application, and details are not described below again.

Optionally, in this embodiment of this application, the PFD management response message 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S607 and S608.

S607: If the PFDF network element determines that the PFD information cannot be sent to some PCEF network elements within the allowed delay (in a push mode and a pull mode, if a caching time is less than the allowed delay, the PFDF network element still cannot provide the PFD information for the PCEF network element), the PFDF network element sends a PFD report 1 to the SCEF network element, and the SCEF network element receives the PFD report 1 from the PFDF network element.

The PFD report 1 includes first indication information, an application ID corresponding to the PFD information, and information 1 of a PCEF network element on which the PFD cannot be deployed. For related descriptions, refer to step S605. Details are not described herein again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S608: The SCEF network element sends a PFD report 2 to the application server, and the application server receives the PFD report 2 from the SCEF network element.

The PFD report 2 includes the first indication information, the application ID corresponding to the PFD information, and information 2 of the PCEF network element on which the PFD cannot be deployed. For related descriptions, refer to step S606. Details are not described herein again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in still another possible implementation, the PFD information management method provided in this embodiment of this application further includes the following steps S609a/S609b to S613.

In step 609a and step S610a, the PFDF network element and the PCEF network element support the push mode. The following steps are performed on each PCEF network element managed by the PFDF network element.

S609a: The PFDF network element sends a PFD provisioning message to the PCEF network element, and the PCEF network element receives the PFD provisioning message from the PFDF network element.

The PFD provisioning message carries the application ID and the PFD information.

S610a: After the PCEF network element creates, modifies, and deletes, based on the PFD provisioning message, a PFD(s) corresponding to the application ID stored in the PCEF network element, the PCEF network element sends a response message 1 to the PFDF network element. The PFDF network element receives the response message 1 sent by the PCEF network element.

In step S609b and step S610b, the PFDF network element and the PCEF network element support the pull mode. The following steps are performed on each PCEF network element managed by the PFDF network element.

S609b: When a PCC rule that carries the application ID is activated but has no corresponding PFD, or when a PFD timer corresponding to the application ID expires, and a PCC rule that carries the application ID is still activated, the PCEF network element sends a PFD request message to the PFDF network element, and the PFDF network element receives the PFD request message from the PCEF network element.

The PFD request message carries the application ID.

S610b: The PFDF network element sends a response message 2 to the PCEF network element, and the PCEF network element receives the response message 2 from the PFDF network element.

The PFD response message 2 carries the application ID and corresponding PFD information.

S611: If the PCEF network element cannot correctly execute the PFD, or an error occurs during execution of the PFD, the PCEF network element sends a PFD report 3 to the PFDF network element, and the PFDF network element receives the PFD report 3 from the PCEF network element.

The PFD report 3 carries first indication information and an application ID corresponding to PFD information that fails to be deployed.

Optionally, in this embodiment of this application, the PFD report 3 may further include one or both of a cause value of a deployment failure of the PFD information or a PFD identifier corresponding to the PFD information that cannot be successfully deployed. The cause value of the deployment failure of the PFD information may be, for example, a communication fault.

S612: The PFDF network element sends a PFD report 1 to the SCEF network element, and the SCEF network element receives the PFD report 1 from the PFDF network element.

The PFD report 1 includes the first indication information, an application ID corresponding to the PFD information, and information 1 of a PCEF network element on which the PFD cannot be deployed. For related descriptions, refer to step S605. Details are not described herein again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S613: The SCEF network element sends a PFD report 2 to the application server, and the application server receives the PFD report 2 from the SCEF network element.

The PFD report 2 includes the first indication information, the application ID corresponding to the PFD information, and information 2 of the PCEF network element on which the PFD cannot be deployed. For related descriptions, refer to step S606. Details are not described herein again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

Further, in this embodiment of this application, after receiving the PFD report 2 or a PFD management response message 1, the application server may use, based on the information 2 that is of the PCEF network element on which the PFD information cannot be deployed and that is carried in the PFD report 2 or the PFD management response message 1, for service data of users from the PCEFs on which the PFD is not correctly deployed, corresponding configuration policies, for example, reducing fees of the users and playing common videos.

According to the PFD information management method provided in this embodiment of this application, after determining that the PFD information fails to be deployed on the PCEF network element, the PFDF network element may send, to the SCEF network element, the first indication information, the application ID corresponding to the PFD information, and the information 1 of the PCEF network element on which the PFD information cannot be deployed. In this way, the SCEF network element may send, to the application server, the first indication information, the application ID corresponding to the PFD information, and the information 2 of the PCEF network element on which the PFD cannot be deployed. Therefore, the application server can learn of information about the PCEF network element on which the PFD information is not successfully deployed. Further, the application server may execute a corresponding policy on a service accessed by using the PCEF network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the PFDF network element in steps S601 to S613 may be performed by the processor 501 in the communications device 500 shown in FIG. 5 by invoking the application program code stored in the memory 503. This is not limited in this embodiment.

Figure 7:
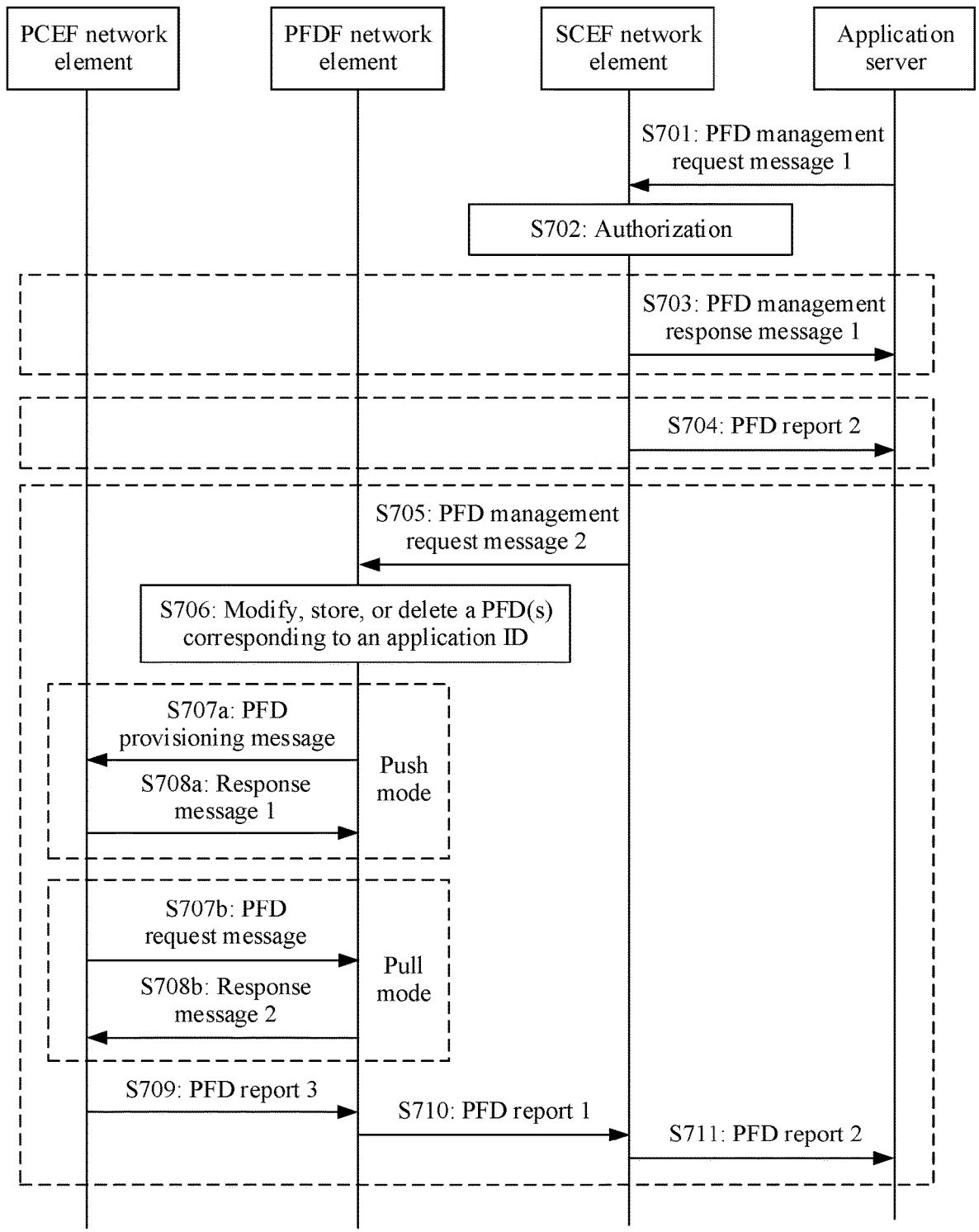
FIG. 7 is a schematic flowchart 2 of a PFD information management method according to an embodiment of this application.

Optionally, using an example in which the communications system shown in FIG. 1 is applied to the 4G network C/U non-separation PCC architecture shown in FIG. 2, a first network element is an SCEF network element, a second network element is a PCEF network element, and a third network element is an application server, as shown in FIG. 7, an embodiment of this application provides another PFD information management method, including the following steps.

S701 and S702 are the same as steps S601 and S602. For related descriptions, refer to the embodiment shown in FIG. 6. Details are not described herein again.

Further, in a possible implementation, the PFD information management method provided in this embodiment of this application further includes the following step S703.

S703: If the SCEF network element determines that the PFD information cannot be sent to some PFDF network elements within a configured period of time (for a scenario in which the allowed delay is not carried), the SCEF network element sends a PFD management response message 1 to the application server, and the application server receives the PFD management response message 1 from the SCEF network element.

The PFD management response message 1 includes first indication information, an application ID corresponding to the PFD information, and information 2 of a PCEF network element on which the PFD cannot be deployed. The information 2 of the PCEF network element is used to identify the PCEF network element on which the PFD information cannot be deployed, and the first indication information indicates that the PFD information fails to be deployed. For related descriptions, refer to step S606. Details are not described herein again.

It should be noted that, in this embodiment of this application, information 1 of a PCEF network element or information 2 of a PCEF network element, managed by the PFDF network element, is configured on the SCEF network element. When the SCEF network element determines that the PFD information cannot be sent to some PFDF network elements within the configured period of time, the SCEF network element determines that the PFD information fails to be deployed on PCEF network elements managed by these PFDF network elements. This is uniformly described herein, and details are not described below again.

Optionally, in this embodiment of this application, the PFD management response message 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following step S704.

S704: If the SCEF network element determines that the PFD information cannot be sent to some PCEF network elements within the allowed delay (in a push mode and a pull mode, if a caching time is less than the allowed delay, the PFDF network element still cannot provide the PFD information for the PCEF network element), the SCEF network element sends a PFD report 2 to the application server, and the application server receives the PFD report 2 from the SCEF network element.

The PFD report 2 includes first indication information, an application ID corresponding to the PFD information, and information 2 of a PCEF network element on which the PFD cannot be deployed. The information 2 of the PCEF network element is used to identify the PCEF network element on which the PFD information cannot be deployed, and the first indication information indicates that the PFD information fails to be deployed. For related descriptions, refer to step S606. Details are not described herein again.

It should be noted that, in this embodiment of this application, information 1 of a PCEF network element or information 2 of a PCEF network element, managed by the PFDF network element, is configured on the SCEF network element. When the SCEF network element determines that the PFD information cannot be sent to some PCEF network elements within the allowed delay, the SCEF network element determines that the PFD information fails to be deployed on PCEF network elements managed by these PFDF network elements. This is uniformly described herein, and details are not described below again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in still another possible implementation, the PFD information management method provided in this embodiment of this application further includes the following steps S705 to S711.

S705 and S706 are the same as steps S603 and S604. For related descriptions, refer to the embodiment shown in FIG. 6. Details are not described herein again.

S707a to S711 are the same as steps S609a to S613. For related descriptions, refer to the embodiment shown in FIG. 6. Details are not described herein again.

Further, in this embodiment of this application, after receiving the PFD report 2 or the PFD management response message 1, the application server may use, based on the information 2 that is of the PCEF network element on which the PFD information cannot be deployed and that is carried in the PFD report 2 or the PFD management response message 1, for service data of users from the PCEFs on which the PFD is not correctly deployed, corresponding configuration policies, for example, reducing fees of the users and playing common videos.

According to the PFD information management method provided in this embodiment of this application, after determining that the PFD information fails to be deployed on the PCEF network element, the SCEF network element may send, to the application server, the first indication information, the application ID corresponding to the PFD information, and the information 2 of the PCEF network element on which the PFD information cannot be deployed. Therefore, the application server can learn of information about the PCEF network element on which the PFD information is not successfully deployed. Further, the application server may execute a corresponding policy on a service accessed by using the PCEF network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the SCEF network element in steps S701 to S711 may be performed by the processor 501 in the communications device 500 shown in FIG. 5 by invoking the application program code stored in the memory 503. This is not limited in this embodiment.

Figure 8:
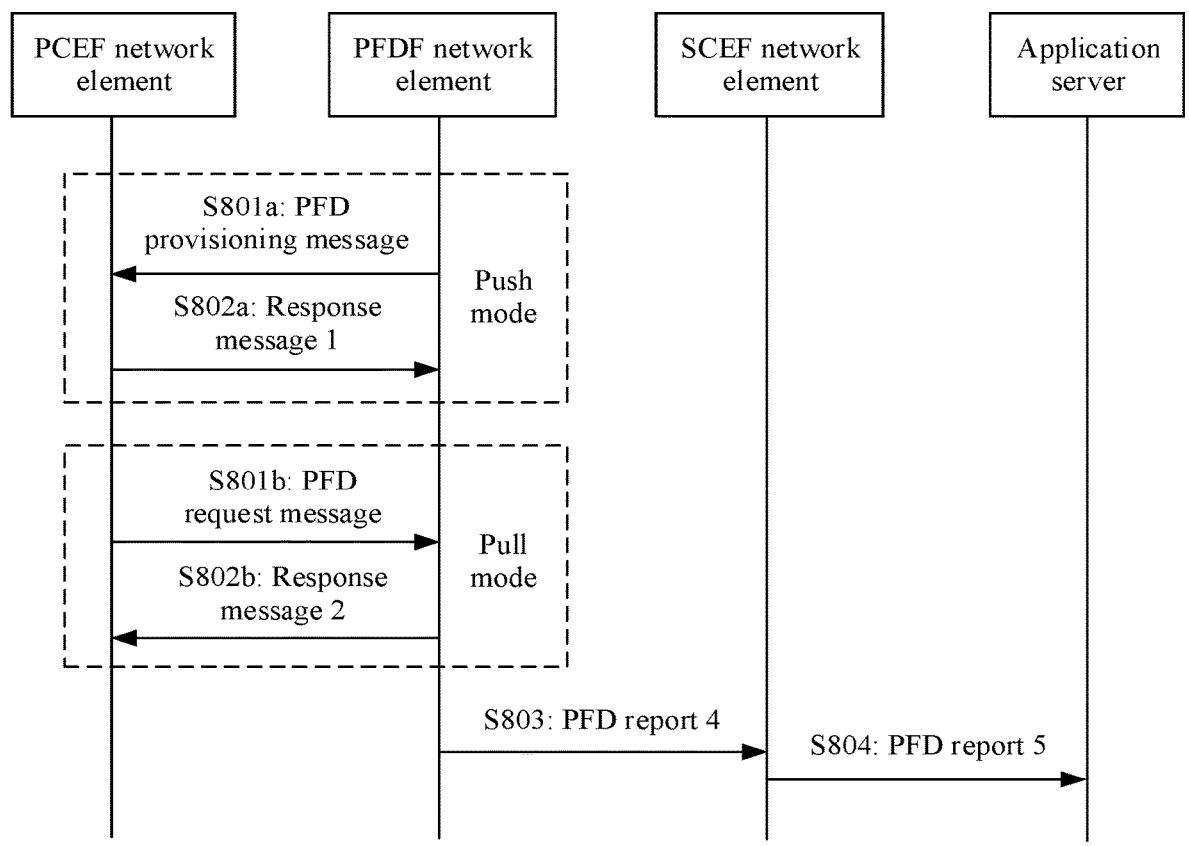
FIG. 8 is a schematic flowchart 3 of a PFD information management method according to an embodiment of this application.

Optionally, FIG. 8 describes a procedure in which after an error occurs in PFD deployment, a PFDF is redeployed, and a success indication is sent to an application server by using an SCEF network element in the procedure shown in FIG. 6 or FIG. 7. The procedure includes the following steps.

The PFDF network element performs steps S801a and S802a or steps S801b and S802b on a PCEF network element on which a PFD deployment error occurs.

S801a and S802a are the same as steps S609a and S610a. For related descriptions, refer to the embodiment shown in FIG. 6. Details are not described herein again.

S801b and S802b are the same as steps S609b and S610b. For related descriptions, refer to the embodiment shown in FIG. 6. Details are not described herein again.

S803: After determining that the PFD information is successfully deployed on the PCEF network element, the PFDF network element sends a PFD report 4 to the SCEF network element, and the SCEF network element receives the PFD report 4 from the PFDF network element.

The PFD report 4 carries second indication information, an application ID corresponding to the PFD information, and information 1 of the PCEF network element on which the PFD information is successfully deployed, and the second indication information indicates that the PFD information is successfully deployed. For related descriptions of the information 1 of the PCEF network element, refer to the embodiment shown in FIG. 6. Details are not described herein again.

Optionally, in this embodiment of this application, if the PFDF network element determines that all PFD information is successfully deployed on the PCEF network element, on which the PFD information fails to be deployed, managed by the PFDF network element, the PFD report 4 may not carry the information 1 of the PCEF network element on which the PFD information is successfully deployed.

Optionally, the PFD report 4 may further carry a PFD identifier corresponding to the successfully deployed PFD information.

It should be noted that, in this embodiment of this application, that the PFD information is successfully deployed means that the PFD information is successfully installed, modified, or deleted. This is uniformly described herein. The description is applicable to all the embodiments of this application, and details are not described below again.

S804: The SCEF network element sends a PFD report 5 to the application server, and the application server receives the PFD report 5 from the SCEF network element.

The PFD report 5 carries the second indication information, the application ID corresponding to the PFD information, and information 2 of the PCEF network element on which the PFD information is successfully deployed, and the second indication information indicates that the PFD information is successfully deployed. For related descriptions of the information 2 of the PCEF network element, refer to the embodiment shown in FIG. 6. Details are not described herein again.

Optionally, in this embodiment of this application, if the SCEF network element determines that all PFD information is successfully deployed on the PCEF network element, on which the PFD information fails to be deployed, managed by the SCEF network element, the PFD report 5 may not carry the information 2 of the PCEF network element on which the PFD information is successfully deployed.

Optionally, the PFD report 5 may further carry a PFD identifier corresponding to the successfully deployed PFD information.

Further, in this embodiment of this application, after receiving the PFD report 5, the application server may use, based on the information 2 that is of the PCEF network element on which the PFD information is successfully deployed and that is carried in the PFD report 5 or the foregoing information 2 of the PCEF network element on which the PFD information fails to be deployed (that is, in a scenario in which the PFDF network element or the SCEF network element determines that all PFD information is successfully deployed on the PCEF network element, on which the PFD information fails to be deployed, managed by the PFDF network element or the SCEF network element), for service data of users from the PCEF network elements on which the PFD information has been correctly deployed, corresponding configuration policies, for example, increasing fees of the users and playing HD videos.

According to the PFD information management method provided in this embodiment of this application, after the PFDF network element or the SCEF network element determines that the PFD information is successfully deployed on the PCEF network element, the application server can learn of information about the PCEF network element on which the PFD information is successfully deployed. Further, the application server may execute a corresponding policy on a service accessed by using the PCEF network element. For example, the user fees are increased, and the HD videos are played, thereby improving user experience.

The actions of the PFDF network element or the SCEF network element in steps S801a to S804 may be performed by the processor 501 in the communications device 500 shown in FIG. 5 by invoking the application program code stored in the memory 503. This is not limited in this embodiment.

Optionally, the PCEF network element in the embodiment shown in FIG. 6, FIG. 7, or FIG. 8 may also be replaced with a service detection function (TDF) network element. This is uniformly described herein, and details are not described below again.

Figure 9:
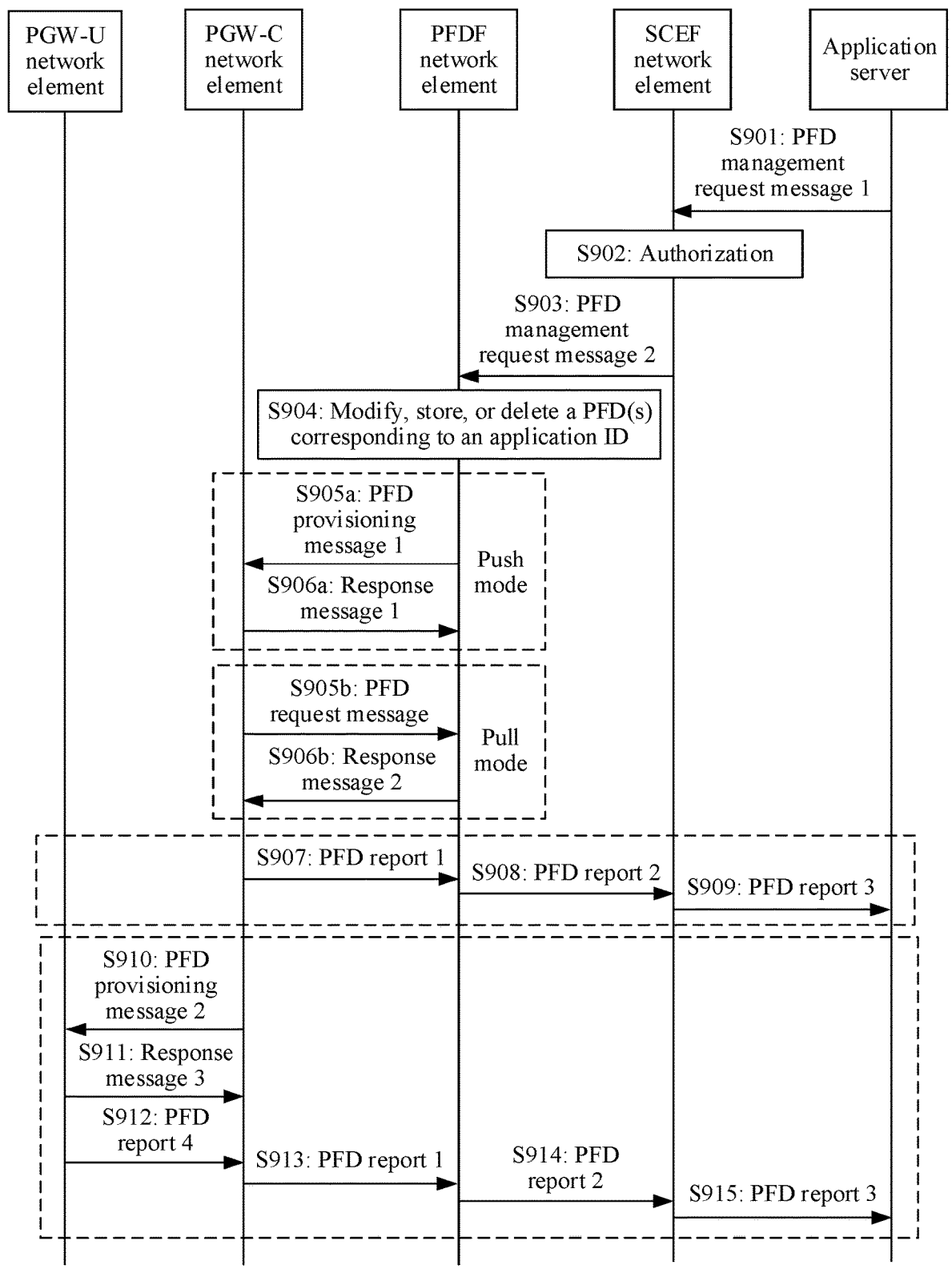
FIG. 9 is a schematic flowchart 4 of a PFD information management method according to an embodiment of this application.

Optionally, using an example in which the communications system shown in FIG. 1 is applied to the 4G network C/U separation PCC architecture shown in FIG. 3, a first network element is a PGW-C network element, a second network element is a PGW-U network element, and a third network element is a PFDF network element, as shown in FIG. 9, an embodiment of this application provides another PFD information management method, including the following steps.

S901 to S904 are the same as steps S601 to S604. For related descriptions, refer to the embodiment shown in FIG. 6. Details are not described herein again.

Further, in step S905a and step S906a, the PGW-C network element and the PFDF network element support a push mode. The following steps are performed on each PGW-C network element managed by the PFDF network element.

S905a: The PFDF network element sends a PFD provisioning message 1 to the PGW-C network element, and the PGW-C network element receives the PFD provisioning message 1 from the PFDF network element.

The PFD provisioning message 1 carries the application ID and the PFD information.

S906a: After the PGW-C network element creates, modifies, and deletes, based on the PFD provisioning message 1, a PFD(s) corresponding to the application ID stored in the PGW-C network element, the PGW-C network element sends a response message 1 to the PFDF network element. The PFDF network element receives the response message 1 from the PGW-C network element.

In step S905b and step S906b, the PFDF network element and the PGW-C network element support a pull mode. The following steps are performed on each PGW-C network element managed by the PFDF network element.

S905b: When a PCC rule that carries the application ID is activated but has no corresponding PFD, or when a PFD timer corresponding to the application ID expires, and a PCC rule that carries the application ID is still activated, the PGW-C network element sends a PFD request message to the PFDF network element, and the PFDF network element receives the PFD request message from the PGW-C network element.

The PFD request message carries the application ID.

S906b: The PFDF network element sends a response message 2 to the PGW-C network element, and the PGW-C network element receives the response message 2 from the PFDF network element.

The PFD response message 2 carries the application ID and corresponding PFD information.

Further, in a possible implementation, the PFD information management method provided in this embodiment of this application further includes the following steps S907 to S909.

S907: If the PGW-C network element determines that the PFD information cannot be sent to some PGW-U network elements within a configured period of time (for a scenario in which the allowed delay is not carried), or if the PGW-C network element determines that the PFD information cannot be sent to some PGW-U network elements within the allowed delay (in the push mode and the pull mode, if a caching time is less than the allowed delay, the PGW-C network element still cannot provide the PFD information for the PGW-U network element), the PGW-C network element sends a PFD report 1 to the PFDF network element, and the PFDF network element receives the PFD report 1 from the PGW-C network element.

The PFD report 1 includes first indication information, an application ID corresponding to the PFD information, and information 1 of a PGW-U network element on which the PFD cannot be deployed. The information 1 of the PGW-U network element is used to identify the PGW-U network element on which the PFD information cannot be deployed, and the first indication information indicates that the PFD information fails to be deployed.

Optionally, in this embodiment of this application, the information 1 of the PGW-U network element may include: one or more of address range information, allocated to a terminal device, corresponding to the PGW-U network element (for example, an IP address pool corresponding to the PGW-U network element), a routing area identifier or a tracking area identifier corresponding to the PGW-U network element, a cell identifier corresponding to the PGW-U network element, an identifier of the PGW-U network element, an identifier of an access device corresponding to the PGW-U network element, or a data network access identifier corresponding to the PGW-U network element.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S908: The PFDF network element sends a PFD report 2 to the SCEF network element, and the SCEF network element receives the PFD report 2 from the PFDF network element.

The PFD report 2 includes the first indication information, the application ID corresponding to the PFD information, and the information 1 of the PGW-U network element on which the PFD cannot be deployed. For related descriptions, refer to step S907. Details are not described herein again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S909: The SCEF network element sends a PFD report 3 to the application server, and the application server receives the PFD report 3 from the SCEF network element.

The PFD report 3 includes the first indication information, the application ID corresponding to the PFD information, and information 2 of the PGW-U network element on which the PFD cannot be deployed.

Optionally, in this embodiment of this application, the information 2 of the PGW-U network element may include: one or more of address range information, allocated to a terminal device, corresponding to the PGW-U network element (for example, an IP address pool corresponding to the PGW-U network element), a routing area identifier or a tracking area identifier corresponding to the PGW-U network element, a cell identifier corresponding to the PGW-U network element, an identifier of the PGW-U network element, an identifier of an access device corresponding to the PGW-U network element, a data network access identifier corresponding to the PGW-U network element, a geographic location corresponding to the PGW-U network element, or a municipal address corresponding to the PGW-U network element.

It should be noted that, for network security, the SCEF network element may not provide the information 1 of the PGW-U network element in the 3GPP for the application server, but maps the information 1 of the PGW-U network element to the data network access identifier corresponding to the PGW-U network element, the geographic location corresponding to the PGW-U network element, or the municipal address corresponding to the PGW-U network element, in the information 2 of the PGW-U network element, and provides for the application server. This is uniformly described herein. The description is applicable to all the embodiments of this application, and details are not described below again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S910 to S915.

S910: If the PGW-C network element provides a packet detection rule (PDR) carrying the application ID for the PGW-U network element, the PGW-C network element sends a PFD provisioning message 2 to the PGW-U network element. The PGW-U network element receives the PFD provisioning message 2 from the PGW-C network element.

The PFD provisioning message 2 carries a PFD list corresponding to the application ID. If all PFDs corresponding to the application ID are deleted, the PFD provisioning message 2 carries only the application ID but does not carry any PFD.

S911: If the PFD provisioning message 2 does not carry any PFD, the PGW-U network element deletes all stored PFDs corresponding to the application ID. If the PFD provisioning message 2 carries the PFD list, the PGW-U network element stores the PFD list. Further, the PGW-U network element sends a response message 3 to the PGW-C network element. The PGW-C network element receives the response message 3 from the PGW-U network element.

S912: If the PGW-U network element cannot correctly execute the PFD, or an error occurs during execution of the PFD, the PGW-U network element sends a PFD report 4 to the PGW-C network element, and the PGW-C network element receives the PFD report 4 from the PGW-U network element.

The PFD report 4 carries first indication information and an application ID corresponding to PFD information that fails to be deployed.

Optionally, in this embodiment of this application, the PFD report 4 may further include one or both of a cause value of a deployment failure of the PFD information or a PFD identifier corresponding to the PFD information that cannot be successfully deployed. The cause value of the deployment failure of the PFD information may be, for example, a communication fault.

S913: The PGW-C network element sends a PFD report 1 to the PFDF network element, and the PFDF network element receives the PFD report 1 from the PGW-C network element.

The PFD report 1 includes the first indication information, an application ID corresponding to the PFD information, and information 1 of a PGW-U network element on which the PFD cannot be deployed. For related descriptions, refer to step S907. Details are not described herein again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S914 and S915 are the same as steps S908 and S909. For related descriptions, refer to steps S908 and S909. Details are not described herein again.

Further, in this embodiment of this application, after receiving the PFD report 3, the application server may use, based on the information 2 that is of the PGW-U network element on which the PFD information cannot be deployed and that is carried in the PFD report 3, for service data of users from the PGW-U network elements on which the PFD is not correctly deployed, corresponding configuration policies, for example, reducing fees of the users and playing common videos.

In addition, in the foregoing procedure, if the PGW-C network element learns of that the PFD corresponding to the application ID is not successfully deployed on some PGW-U network elements, these PGW-U network elements are not selected when a routing steering policy based on an application request is executed. This is uniformly described herein, and details are not described below again.

According to the PFD information management method provided in this embodiment of this application, after determining that the PFD information fails to be deployed on the PGW-U network element, the PGW-C network element may send, to the PFDF network element, the first indication information, the application ID corresponding to the PFD information, and the information 1 of the PGW-U network element on which the PFD information cannot be deployed.

In this way, the PFDF network element may send, to the SCEF network element, the first indication information, the application ID corresponding to the PFD information, and the information 1 of the PGW-U network element on which the PFD information cannot be deployed. Further, the SCEF network element sends, to the application server, the first indication information, the application ID corresponding to the PFD information, and the information 2 of the PGW-U network element on which the PFD cannot be deployed. Therefore, the application server can learn of information about the PGW-U network element on which the PFD information is not successfully deployed. Further, the application server may execute a corresponding policy on a service accessed by using the PGW-U network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the PGW-C network element in steps S901 to S915 may be performed by the processor 501 in the communications device 500 shown in FIG. 5 by invoking the application program code stored in the memory 503. This is not limited in this embodiment.

Figure 10A:
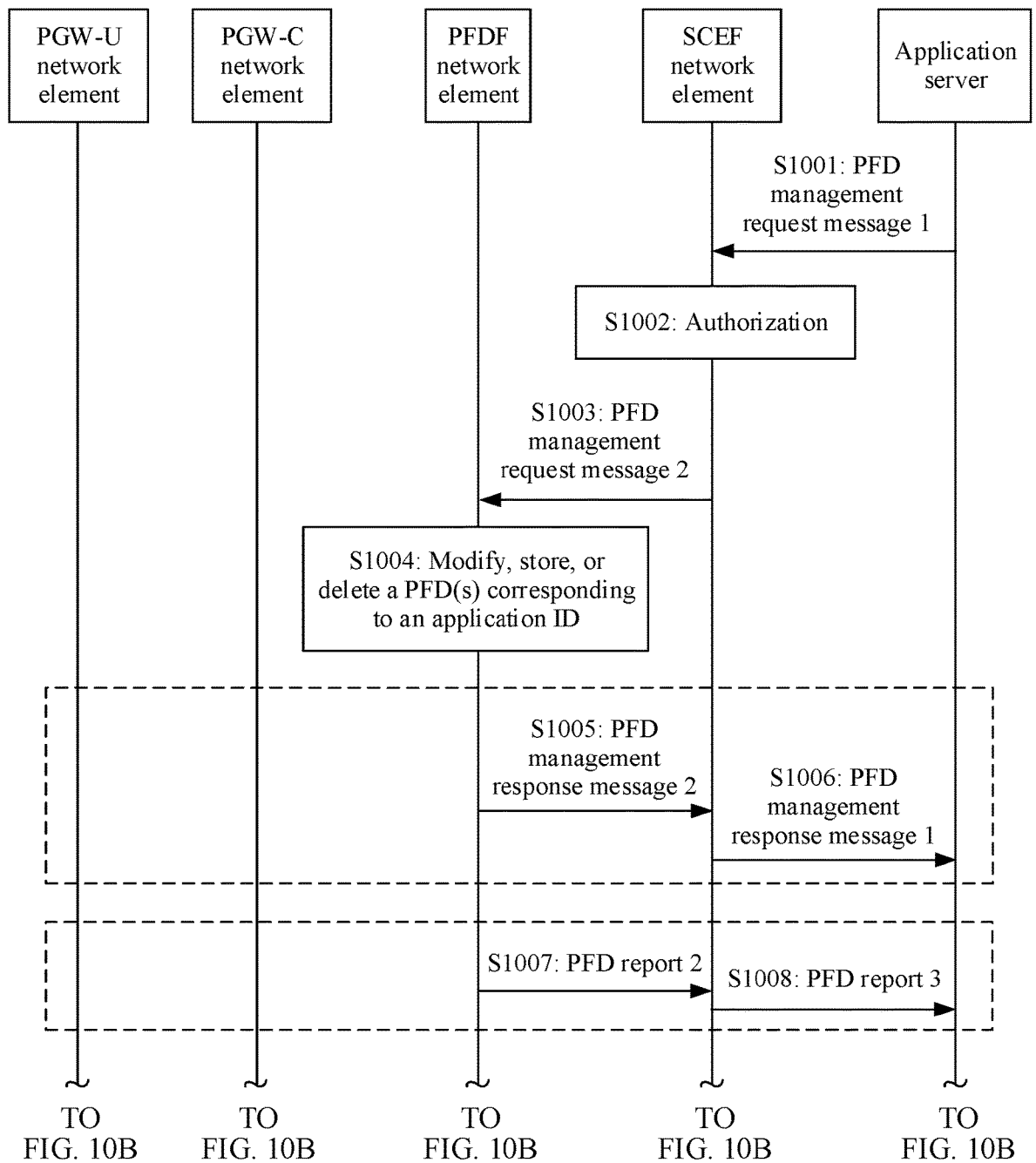
FIG. 10A and FIG. 10B are a schematic flowchart 5 of a PFD information management method according to an embodiment of this application.
Figure 10B:
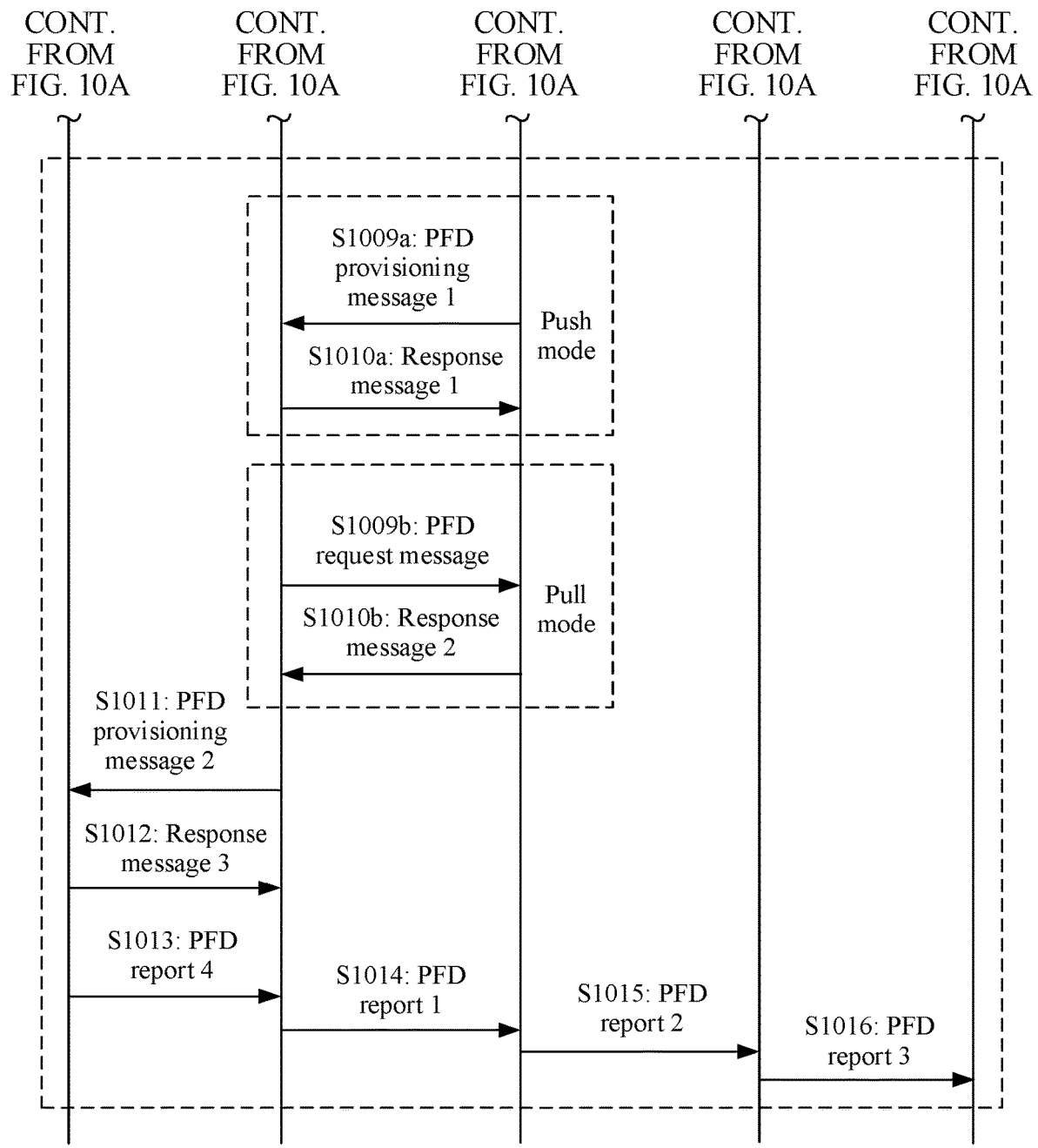

Optionally, using an example in which the communications system shown in FIG. 1 is applied to the 4G network C/U separation PCC architecture shown in FIG. 3, a first network element is a PFDF network element, a second network element is a PGW-U network element, and a third network element is an SCEF network element, as shown in FIG. 10A and FIG. 10B, an embodiment of this application provides another PFD information management method, including the following steps:

S1001 to S1004 are the same as steps S601 to S604. For related descriptions, refer to the embodiment shown in FIG. 6. Details are not described herein again.

Further, in a possible implementation, the PFD information management method provided in this embodiment of this application further includes the following steps S1005 and S1006.

S1005: If the PFDF network element determines that the PFD information cannot be sent to some PGW-C network elements within a configured period of time (for a scenario in which the allowed delay is not carried), the PFDF network element sends a PFD management response message 2 to the SCEF network element, and the SCEF network element receives the PFD management response message 2 from the PFDF network element.

The PFD management response message 2 includes first indication information, an application ID corresponding to the PFD information, and information 1 of a PGW-U network element on which the PFD cannot be deployed. For related descriptions, refer to step S907 in the embodiment shown in FIG. 9. Details are not described herein again.

It should be noted that, in this embodiment of this application, information 1 of a PGW-U network element managed by the PGW-C network element is configured on the PFDF network element. When the PFDF network element determines that the PFD information cannot be sent to some PGW-C network elements within the configured period of time, the PFDF network element determines that the PFD information fails to be deployed on PGW-U network elements managed by these PGW-C network elements. This is uniformly described herein, and details are not described below again.

Optionally, in this embodiment of this application, the PFD management response message 2 may further include one or both of a cause value of a deployment failure of the PFD information or a PFD identifier corresponding to the PFD information that cannot be successfully deployed. The cause value of the deployment failure of the PFD information may be, for example, a communication fault.

S1006: The SCEF network element sends a PFD management response message 1 to the application server, and the application server receives the PFD management response message 1 from the SCEF network element.

The PFD management response message 1 includes the first indication information, the application ID corresponding to the PFD information, and information 2 of the PGW-U network element on which the PFD cannot be deployed. For related descriptions, refer to step S909 in the embodiment shown in FIG. 9. Details are not described herein again.

Optionally, in this embodiment of this application, the PFD management response message 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S1007 and S1008.

S1007: If the PFDF network element determines that the PFD information cannot be sent to some PGW-C network elements within the allowed delay (in a push mode and a pull mode, if a caching time is less than the allowed delay, the PFDF network element still cannot provide the PFD information for the PGW-C network element), the PFDF network element sends a PFD report 2 to the SCEF network element, and the SCEF network element receives the PFD report 2 from the PFDF network element.

The PFD report 2 includes first indication information, an application ID corresponding to the PFD information, and information 1 of a PGW-U network element on which the PFD cannot be deployed. For related descriptions, refer to step S907 in the embodiment shown in FIG. 9. Details are not described herein again.

It should be noted that, in this embodiment of this application, information 1 of a PGW-U network element managed by the PGW-C network element is configured on the PFDF network element. When the PFDF network element determines that the PFD information cannot be sent to some PGW-C network elements within the allowed delay, the PFDF network element determines that the PFD information fails to be deployed on PGW-U network elements managed by these PGW-C network elements. This is uniformly described herein, and details are not described below again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

S1008: The SCEF network element sends a PFD report 3 to the application server, and the application server receives the PFD report 3 from the SCEF network element.

The PFD report 3 includes the first indication information, the application ID corresponding to the PFD information, and information 2 of the PGW-U network element on which the PFD cannot be deployed. For related descriptions, refer to step S909 in the embodiment shown in FIG. 9. Details are not described herein again.

Optionally, in this embodiment of this application, the PFD report 3 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S1009a to S1016.

S1009a and S1010a are the same as steps S905a and S906a. For related descriptions, refer to the embodiment shown in FIG. 9. Details are not described herein again.

S1009b and S1010b are the same as steps S905b and S906b. For related descriptions, refer to the embodiment shown in FIG. 9. Details are not described herein again.

S1011 to S1016 are the same as steps S910 to S915. For related descriptions, refer to the embodiment shown in FIG. 9. Details are not described herein again.

Further, in this embodiment of this application, after receiving the PFD report 3 or the PFD management response message 1, the application server may use, based on the information 2 that is of the PGW-U network element on which the PFD information cannot be deployed and that is carried in the PFD report 3 or the PFD management response message 1, for service data of users from the PGW-U network elements on which the PFD is not correctly deployed, corresponding configuration policies, for example, reducing fees of the users and playing common videos.

According to the PFD information management method provided in this embodiment of this application, after determining that the PFD information fails to be deployed on the PGW-U network element, the PFDF network element may send, to the SCEF network element, the first indication information, the application ID corresponding to the PFD information, and the information 1 of the PGW-U network element on which the PFD information cannot be deployed. Further, the SCEF network element sends, to the application server, the first indication information, the application ID corresponding to the PFD information, and the information 2 of the PGW-U network element on which the PFD cannot be deployed. Therefore, the application server can learn of information about the PGW-U network element on which the PFD information is not successfully deployed. Further, the application server may execute a corresponding policy on a service accessed by using the PGW-U network element. This avoids a problem in the prior art, that may affect user experience, caused by that the application server receives only a response indicating that all PFD information is successfully deployed or none of PFD information is successfully deployed, but cannot learn of a case in which the portion of PFD information fails to be deployed (for the case in which a portion of PFD information fails to be deployed, currently, the application server receives only a response message indicating that the portion of PFD information fails to be deployed).

The actions of the PFDF network element in steps S1001 to S1016 may be performed by the processor 501 in the communications device 500 shown in FIG. 5 by invoking the application program code stored in the memory 503. This is not limited in this embodiment.

Figure 11:
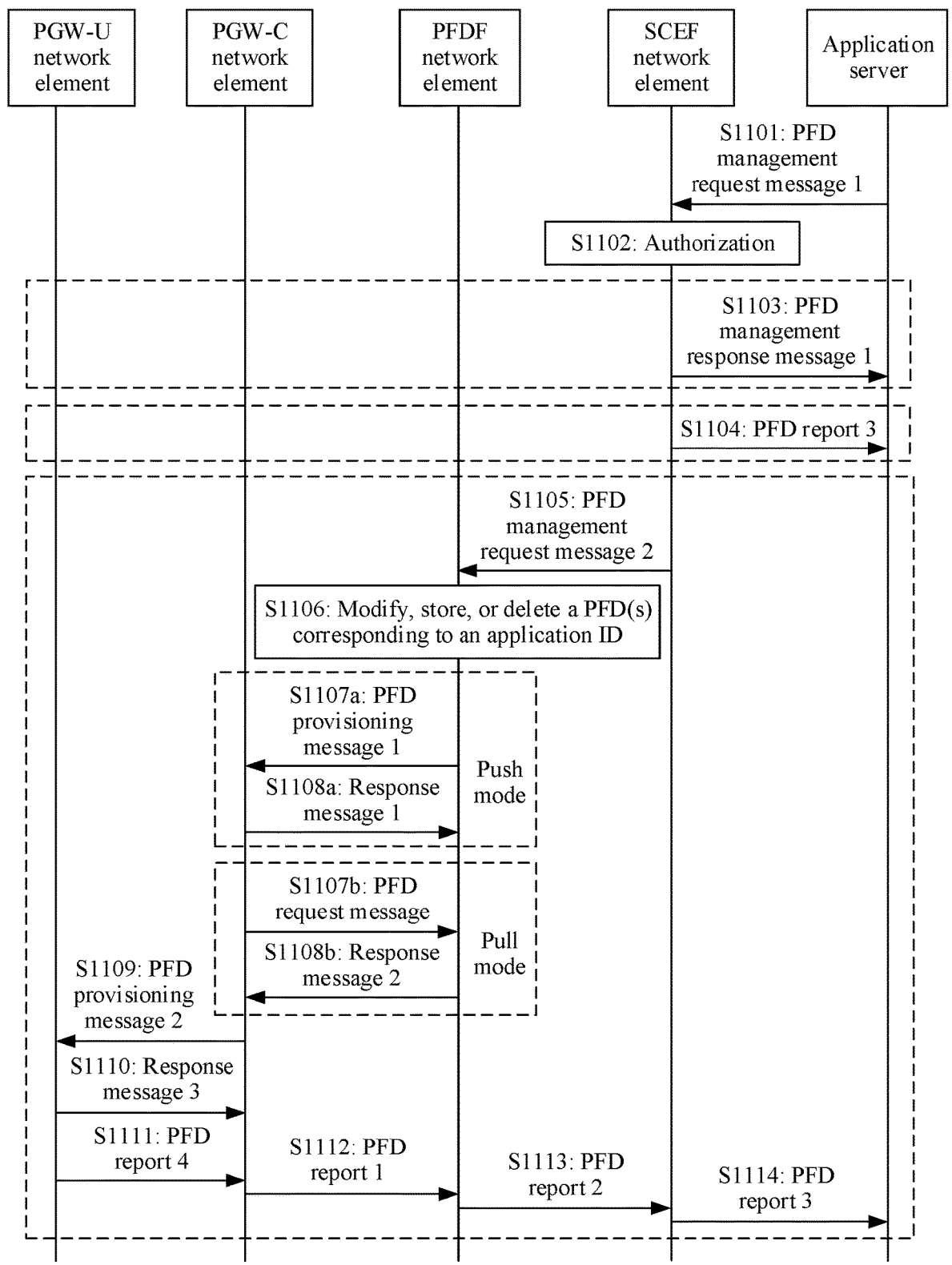
FIG. 11 is a schematic flowchart 6 of a PFD information management method according to an embodiment of this application.

Optionally, using an example in which the communications system shown in FIG. 1 is applied to the 4G network C/U separation PCC architecture shown in FIG. 3, a first network element is an SCEF network element, a second network element is a PGW-U network element, and a third network element is an application server, as shown in FIG. 11, an embodiment of this application provides another PFD information management method, including the following steps:

S1101 and S1102 are the same as steps S601 and S602. For related descriptions, refer to the embodiment shown in FIG. 6. Details are not described herein again.

Further, in a possible implementation, the PFD information management method provided in this embodiment of this application further includes the following step S1103.

S1103: If the SCEF network element determines that the PFD information cannot be sent to some PFDF network elements within a configured period of time (for a scenario in which the allowed delay is not carried), the SCEF network element sends a PFD management response message 1 to the application server, and the application server receives the PFD management response message 1 from the SCEF network element.

The PFD management response message 1 includes first indication information, an application ID corresponding to the PFD information, and information 2 of a PGW-U network element on which the PFD cannot be deployed. For related descriptions, refer to step S909 in the embodiment shown in FIG. 9. Details are not described herein again.

It should be noted that, in this embodiment of this application, information 1 of a PGW-U network element or information 2 of a PGW-U network element, managed by a PGW-C network element managed by a PFDF network element, is configured on the SCEF network element. When the SCEF network element determines that the PFD information cannot be sent to some PFDF network elements within the configured period of time, the SCEF network element determines that the PFD information fails to be deployed on PGW-U network elements managed by PGW-C network elements managed by these PFDF network elements. This is uniformly described herein, and details are not described below again.

Optionally, in this embodiment of this application, the PFD management response message 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following step S1104.

S1104: If the SCEF network element determines that the PFD information cannot be sent to some PFDF network elements within the allowed delay (in a push mode and a pull mode, if a caching time is less than the allowed delay, the SCEF network element still cannot provide the PFD information for the PFDF network element), the SCEF network element sends a PFD report 3 to the application server, and the application server receives the PFD report 3 from the SCEF network element.

The PFD report 3 includes first indication information, an application ID corresponding to the PFD information, and information 2 of a PGW-U network element on which the PFD cannot be deployed. For related descriptions, refer to step S909 in the embodiment shown in FIG. 9. Details are not described herein again.

It should be noted that, in this embodiment of this application, information 1 of a PGW-U network element or information 2 of a PGW-U network element, managed by a PGW-C network element managed by a PFDF network element, is configured on the SCEF network element. When the SCEF network element determines that the PFD information cannot be sent to some PFDF network elements within the allowed delay, the SCEF network element determines that the PFD information fails to be deployed on PGW-U network elements managed by PGW-C network elements managed by these PFDF network elements. This is uniformly described herein, and details are not described below again.

Optionally, in this embodiment of this application, the PFD report 3 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S1105 to S1114.

S1105 and S1106 are the same as steps S603 and S604. For related descriptions, refer to the embodiment shown in FIG. 6. Details are not described herein again.

S1107a and S1108a are the same as steps S905a and S906a. For related descriptions, refer to the embodiment shown in FIG. 9. Details are not described herein again.

S1107b and S1108b are the same as steps S905b and S906b. For related descriptions, refer to the embodiment shown in FIG. 9. Details are not described herein again.

S1109 to S1114 are the same as steps S910 to S915. For related descriptions, refer to the embodiment shown in FIG. 9. Details are not described herein again.

Further, in this embodiment of this application, after receiving the PFD report 3 or the PFD management response message 1, the application server may use, based on the information 2 that is of the PGW-U network element on which the PFD information cannot be deployed and that is carried in the PFD report 3 or the PFD management response message 1, for service data of users from the PGW-U network elements on which the PFD is not correctly deployed, corresponding configuration policies, for example, reducing fees of the users and playing common videos.

According to the PFD information management method provided in this embodiment of this application, after determining that the PFD information fails to be deployed on the PGW-U network element, the SCEF network element may send, to the application server, the first indication information, the application ID corresponding to the PFD information, and the information 2 of the PGW-U network element on which the PFD cannot be deployed. Therefore, the application server can learn of information about the PGW-U network element on which the PFD information is not successfully deployed. Further, the application server may execute a corresponding policy on a service accessed by using the PGW-U network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the SCEF network element in steps S1101 to S1114 may be performed by the processor 501 in the communications device 500 shown in FIG. 5 by invoking the application program code stored in the memory 503. This is not limited in this embodiment.

Figure 12:
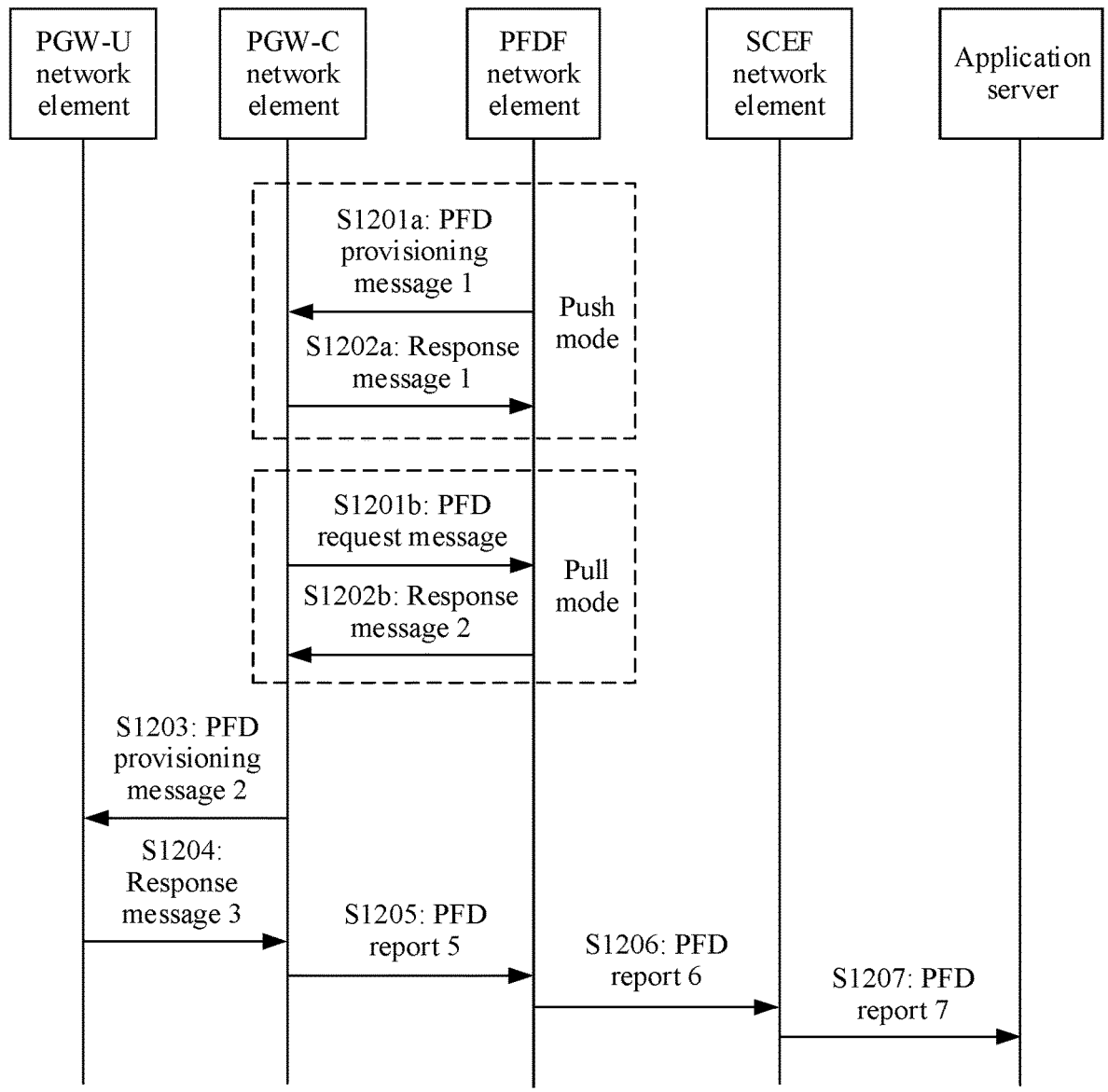
FIG. 12 is a schematic flowchart 7 of a PFD information management method according to an embodiment of this application.

Optionally, FIG. 12 describes performing steps S1201a and S1202a or steps S1201b and S1202b by the PGW-C network element shown in FIG. 9 to FIG. 11.

S1201a and S1202a are the same as steps S905a and S906a. For related descriptions, refer to the embodiment shown in FIG. 9. Details are not described herein again.

S1201b and S1202b are the same as steps S905b and S906b. For related descriptions, refer to the embodiment shown in FIG. 9. Details are not described herein again.

In the embodiments shown in FIG. 9 to FIG. 11, if the PGW-U network element fails to deploy the PFD information, or an error occurs during execution of the PGW-U network element, or when the PGW-C network element receives the PFD information in steps S1201a and S1202a or steps S1201b and S1202b, the following steps S1203 and S1204 are performed.

S1203 and S1204 are the same as steps S910 and S911. For related descriptions, refer to the embodiment shown in FIG. 9. Details are not described herein again.

S1205: After determining that the PFD information is successfully deployed on the PGW-U network element, the PGW-C network element sends a PFD report 5 to the PFDF network element. The PFDF network element receives the PFD report 5 from the PGW-C network element.

The PFD report 5 carries second indication information, an application ID corresponding to the PFD information, and information 1 of a PGW-U network element on which the PFD information is successfully deployed, and the second indication information indicates that the PFD information is successfully deployed. For related descriptions of the information 1 of the PGW-U network element, refer to the embodiment shown in FIG. 9. Details are not described herein again.

Optionally, in this embodiment of this application, if the PGW-C network element determines that all PFD information is successfully deployed on the PGW-U network element, on which the PFD information fails to be deployed, managed by the PGW-C network element, the PFD report 5 may not carry the information 1 of the PGW-U network element on which the PFD information is successfully deployed.

Optionally, the PFD report 5 may further carry a PFD identifier corresponding to the successfully deployed PFD information.

S1206: The PFDF network element sends a PFD report 6 to an SCEF network element, and the SCEF network element receives the PFD report 6 from the PFDF network element.

The PFD report 6 carries the second indication information, the application ID corresponding to the PFD information, and the information 1 of the PGW-U network element on which the PFD information is successfully deployed, and the second indication information indicates that the PFD information is successfully deployed. For related descriptions of the information 1 of the PGW-U network element, refer to the embodiment shown in FIG. 9. Details are not described herein again.

Optionally, in this embodiment of this application, if the PFDF network element determines that all PFD information is successfully deployed on the PGW-U network element, on which the PFD information fails to be deployed, managed by the PFDF network element, the PFD report 6 may not carry the information 1 of the PGW-U network element on which the PFD information is successfully deployed.

Optionally, the PFD report 6 may further carry the PFD identifier corresponding to the successfully deployed PFD information.

S1207: The SCEF network element sends a PFD report 7 to an application server, and the application server receives the PFD report 7 from the SCEF network element.

The PFD report 7 carries the second indication information, the application ID corresponding to the PFD information, and information 2 of the PGW-U network element on which the PFD information is successfully deployed, and the second indication information indicates that the PFD information is successfully deployed. For related descriptions of the information 2 of the PGW-U network element, refer to the embodiment shown in FIG. 9. Details are not described herein again.

Optionally, in this embodiment of this application, if the SCEF network element determines that all PFD information is successfully deployed on the PGW-U network element, on which the PFD information fails to be deployed, managed by the SCEF network element, the PFD report 7 may not carry the information 2 of the PGW-U network element on which the PFD information is successfully deployed.

Optionally, the PFD report 7 may further carry the PFD identifier corresponding to the successfully deployed PFD information.

Further, in this embodiment of this application, after receiving the PFD report 7, the application server may use, based on the information 2 that is of the PGW-U network element on which the PFD information is successfully deployed and that is carried in the PFD report 7 or the foregoing information 2 of the PGW-U network element on which the PFD information fails to be deployed (that is, in a scenario in which the PGW-C network element or the PFDF network element or the SCEF network element determines that all PFD information is successfully deployed on the PGW-U network element, on which the PFD information fails to be deployed, managed by the PGW-C network element or the PFDF network element or the SCEF network element), for service data of users from the PGW-U network elements on which the PFD information has been correctly deployed, corresponding configuration policies, for example, increasing fees of the users and playing HD videos.

According to the PFD information management method provided in this embodiment of this application, after the PGW-C network element or the PFDF network element or the SCEF network element determines that the PFD information is successfully deployed on the PGW-U network element, the application server can learn of information about the PGW-U network element on which the PFD information is successfully deployed. Further, the application server may execute a corresponding policy on a service accessed by using the PGW-U network element. For example, the user fees are increased, and the HD videos are played, thereby improving user experience.

The actions of the PGW-C or the PFDF network element or the SCEF network element in steps S1201a to S1207 may be performed by the processor 501 in the communications device 500 shown in FIG. 5 by invoking the application program code stored in the memory 503. This is not limited in this embodiment.

Figure 13:
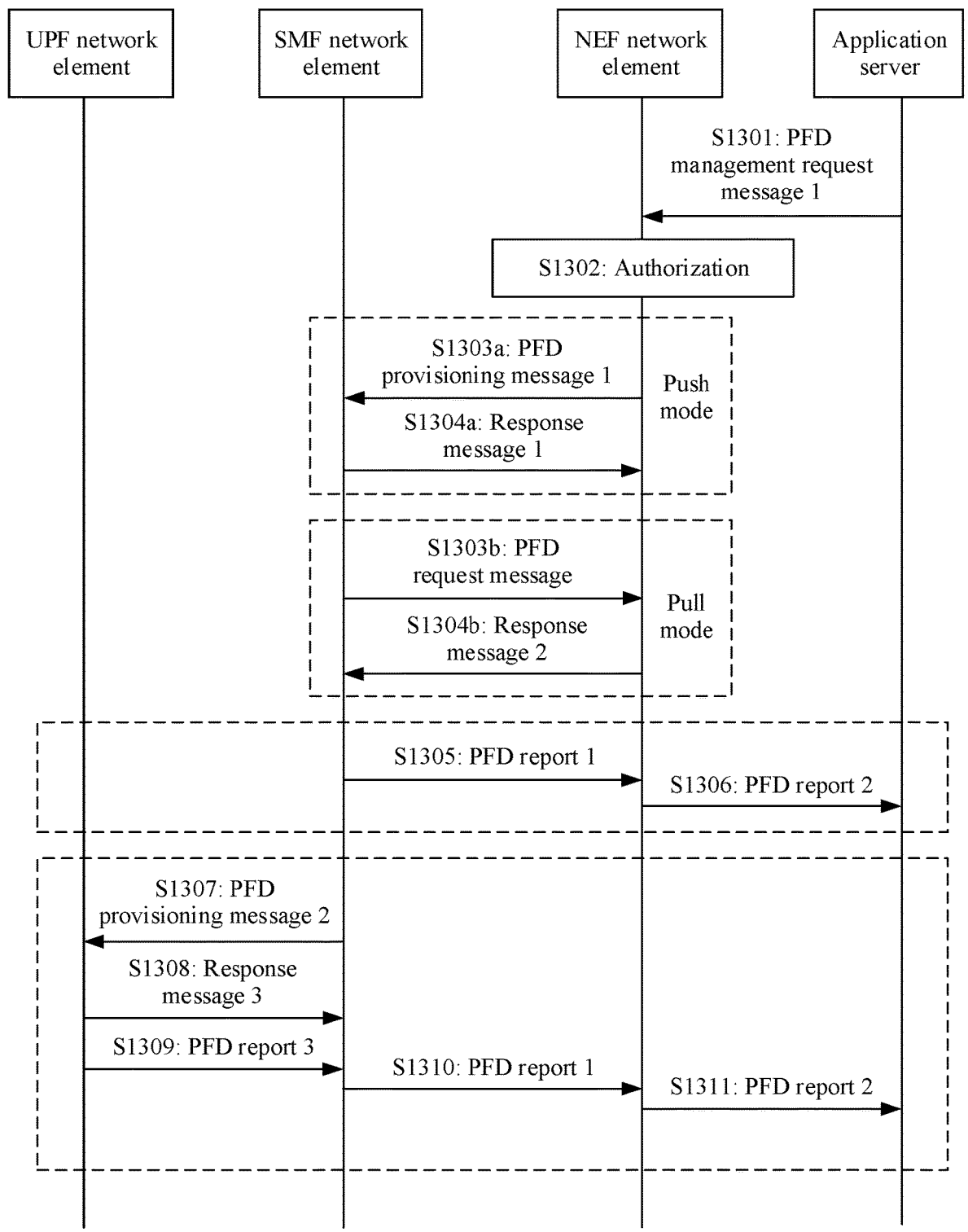
FIG. 13 is a schematic flowchart 8 of a PFD information management method according to an embodiment of this application.

Optionally, using an example in which the communications system shown in FIG. 1 is applied to the 5G network shown in FIG. 4, a first network element is an SMF network element, a second network element is a UPF network element, and a third network element is an NEF network element, as shown in FIG. 13, an embodiment of this application provides another PFD information management method, including the following steps:

S1301 and S1302 are similar to steps S601 and S602. For example, a difference lies in that the SCEF network element in steps S601 and S602 is replaced with the NEF network element in steps S1301 and S1302. Details are not described herein again.

It should be noted that, in this embodiment of this application, the NEF network element further integrates functions of a PFDF network element. This is uniformly described herein. The description is applicable to all the embodiments of this application, and details are not described below again.

Further, in step S1303a and step S1304a, the NEF network element and the SMF network element support a push mode. The following steps are performed on each SMF network element managed by the NEF network element.

S1303a: The NEF network element sends a PFD provisioning message 1 to the SMF network element, and the SMF network element receives the PFD provisioning message 1 from the NEF network element.

The PFD provisioning message 1 carries the application ID and the PFD information.

S1304a: After the SMF network element creates, modifies, and deletes, based on the PFD provisioning message 1, a PFD(s) corresponding to the application ID stored in the SMF network element, the SMF network element sends a response message 1 to the NEF network element. The NEF network element receives the response message 1 from the SMF network element.

In step S1303b and step S1304b, the NEF network element and the SMF network element support a pull mode. The following steps are performed on each SMF network element managed by the NEF network element.

S1303b: When a PCC rule that carries the application ID is activated but has no corresponding PFD, or when a PFD timer corresponding to the application ID expires, and a PCC rule that carries the application ID is still activated, the SMF network element sends a PFD request message to the NEF network element, and the NEF network element receives the PFD request message from the SMF network element.

The PFD request message carries the application ID.

S1304b: The NEF network element sends a response message 2 to the SMF network element, and the SMF network element receives the response message 2 from the NEF network element.

The PFD response message 2 carries the application ID and corresponding PFD information.

Further, in a possible implementation, the PFD information management method provided in this embodiment of this application further includes the following steps S1305 and S1306.

S1305: If the SMF network element determines that the PFD information cannot be sent to some UPF network elements within a configured period of time (for a scenario in which the allowed delay is not carried), or if the SMF network element determines that the PFD information cannot be sent to some UPF network elements within the allowed delay (in the push mode and the pull mode, if a caching time is less than the allowed delay, the SMF network element still cannot provide the PFD information for the UPF network element), the SMF network element sends a PFD report 1 to the NEF network element, and the NEF network element receives the PFD report 1 from the SMF network element.

The PFD report 1 includes first indication information, an application ID corresponding to the PFD information, and information 1 of a UPF network element on which the PFD cannot be deployed. The information 1 of the UPF network element is used to identify the UPF network element on which the PFD information cannot be deployed, and the first indication information indicates that the PFD information fails to be deployed.

Optionally, in this embodiment of this application, the information 1 of the UPF network element may include: one or more of address range information, allocated to a terminal device, corresponding to the UPF network element (for example, an IP address pool corresponding to the UPF network element), a routing area identifier or a tracking area identifier corresponding to the UPF network element, a cell identifier corresponding to the UPF network element, an identifier of the UPF network element, an identifier of an access device corresponding to the UPF network element, or a data network access identifier corresponding to the UPF network element.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S1306: The NEF network element sends a PFD report 2 to the application server, and the application server receives the PFD report 2 from the NEF network element.

The PFD report 2 includes the first indication information, the application ID corresponding to the PFD information, and information 2 of the UPF network element on which the PFD cannot be deployed.

Optionally, in this embodiment of this application, the information 2 of the UPF network element may include: one or more of address range information, allocated to a terminal device, corresponding to the UPF network element (for example, an IP address pool corresponding to the UPF network element), a routing area identifier or a tracking area identifier corresponding to the UPF network element, a cell identifier corresponding to the UPF network element, an identifier of the UPF network element, an identifier of an access device corresponding to the UPF network element, a data network access identifier corresponding to the UPF network element, a geographic location corresponding to the UPF network element, or a municipal address corresponding to the UPF network element.

It should be noted that, for network security, the NEF network element may not provide the information 1 of the UPF network element in the 3GPP for the application server, but maps the information 1 of the UPF network element to the data network access identifier corresponding to the UPF network element, the geographic location corresponding to the UPF network element, or the municipal address corresponding to the UPF network element, in the information 2 of the UPF network element, and provides for the application server. This is uniformly described herein. The description is applicable to all the embodiments of this application, and details are not described below again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following steps S1307 to S1311.

S1307: If the SMF network element provides the UPF network element with a PDR that carries the application ID, the SMF network element sends a PFD provisioning message 2 to the UPF network element. The UPF network element receives the PFD provisioning message 2 from the SMF network element.

The PFD provisioning message 2 carries a PFD list corresponding to the application ID. If all PFDs corresponding to the application ID are deleted, the PFD provisioning message 2 carries only the application ID but does not carry any PFD.

S1308: If the PFD provisioning message 2 does not carry any PFD, the UPF network element deletes all stored PFDs corresponding to the application ID. If the PFD provisioning message 2 carries the PFD list, the UPF network element stores the PFD list. Further, the UPF network element sends a response message 3 to the SMF network element. The SMF network element receives the response message 3 from the UPF network element.

S1309: If the UPF network element cannot correctly execute the PFD, or an error occurs during execution of the PFD, the UPF network element sends a PFD report 3 to the SMF network element, and the SMF network element receives the PFD report 3 from the UPF network element.

The PFD report 3 carries first indication information and an application ID corresponding to PFD information that fails to be deployed.

Optionally, in this embodiment of this application, the PFD report 3 may further include one or both of a cause value of a deployment failure of the PFD information or a PFD identifier corresponding to the PFD information that cannot be successfully deployed. The cause value of the deployment failure of the PFD information may be, for example, a communication fault.

S1310: The SMF network element sends a PFD report 1 to the NEF network element, and the NEF network element receives the PFD report 1 from the SMF network element.

The PFD report 1 includes the first indication information, an application ID corresponding to the PFD information, and information 1 of a UPF network element on which the PFD cannot be deployed. For related descriptions, refer to step S1305. Details are not described herein again.

Optionally, in this embodiment of this application, the PFD report 1 may further include one or both of a cause value of a deployment failure of the PFD information or a PFD identifier corresponding to the PFD information that cannot be successfully deployed. The cause value of the deployment failure of the PFD information may be, for example, a communication fault.

S1311 is the same as step S1306. For related descriptions, refer to step S1306. Details are not described herein again.

Further, in this embodiment of this application, after receiving the PFD report 2, the application server may use, based on the information 2 that is of the UPF network element on which the PFD information cannot be deployed and that is carried in the PFD report 2, for service data of users from the UPF network elements on which the PFD is not correctly deployed, corresponding configuration policies, for example, reducing fees of the users and playing common videos.

In addition, in the foregoing procedure, if the SMF network element learns of that the PFD corresponding to the application ID is not successfully deployed on some UPF network elements, these UPF network elements are not selected when a routing steering policy based on an application request is executed. This is uniformly described herein, and details are not described below again.

According to the PFD information management method provided in this embodiment of this application, after determining that the PFD information fails to be deployed on the UPF network element, the SMF network element may send, to the NEF network element, the first indication information, the application ID corresponding to the PFD information, and the information 1 of the UPF network element on which the PFD information cannot be deployed. In this way, the NEF network element may send, to the application server, the first indication information, the application ID corresponding to the PFD information, and the information 2 of the UPF network element on which the PFD cannot be deployed. Therefore, the application server can learn of information about the UPF network element on which the PFD information is not successfully deployed. Further, the application server may execute a corresponding policy on a service accessed by using the UPF network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the SMF network element in steps S1301 to S1311 may be performed by the processor 501 in the communications device 500 shown in FIG. 5 by invoking the application program code stored in the memory 503. This is not limited in this embodiment.

Figure 14:
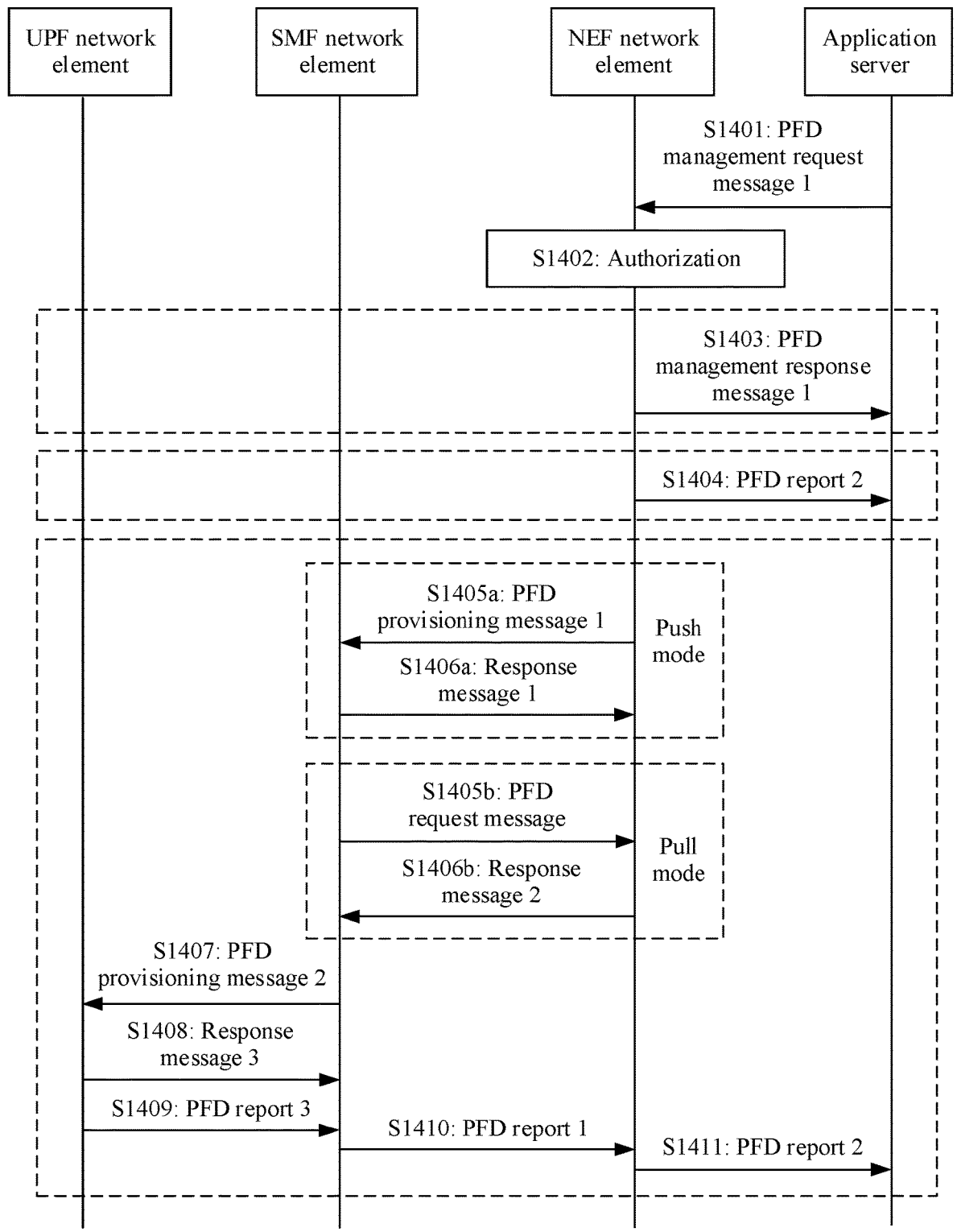
FIG. 14 is a schematic flowchart 9 of a PFD information management method according to an embodiment of this application.

Optionally, using an example in which the communications system shown in FIG. 1 is applied to the 5G network shown in FIG. 4, a first network element is an NEF network element, a second network element is a UPF network element, and a third network element is an application server, as shown in FIG. 14, an embodiment of this application provides another PFD information management method, including the following steps:

S1401 and S1402 are the same as steps S1301 and S1302. For related descriptions, refer to the embodiment shown in FIG. 13. Details are not described herein again.

Further, in a possible implementation, the PFD information management method provided in this embodiment of this application further includes the following step S1403.

S1403: If the NEF network element determines that the PFD information cannot be sent to some SMF network elements within a configured period of time (for a scenario in which the allowed delay is not carried), the NEF network element sends a PFD management response message 1 to the application server, and the application server receives the PFD management response message 1 from the NEF network element.

The PFD management response message 1 includes first indication information, an application ID corresponding to the PFD information, and information 2 of a UPF network element on which the PFD cannot be deployed. For related descriptions, refer to step S1306 in the embodiment shown in FIG. 13. Details are not described herein again.

It should be noted that, in this embodiment of this application, information 1 of a UPF network element or information 2 of a UPF network element, managed by an SMF network element, is configured on the NEF network element. When the NEF network element determines that the PFD information cannot be sent to some SMF network elements within the configured period of time, the NEF network element determines that the PFD information fails to be deployed on UPF network elements managed by these SMF network elements. This is uniformly described herein, and details are not described below again.

Optionally, in this embodiment of this application, the PFD management response message 1 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in another possible implementation, the PFD information management method provided in this embodiment of this application further includes the following step S1404.

S1404: If the NEF network element determines that the PFD information cannot be sent to some SMF network elements within the allowed delay (in a push mode and a pull mode, if a caching time is less than the allowed delay, the NEF network element still cannot provide the PFD information for the SMF network element), the NEF network element sends a PFD report 2 to the application server, and the application server receives the PFD report 2 from the NEF network element.

The PFD report 2 includes first indication information, an application ID corresponding to the PFD information, and information 2 of a UPF network element on which the PFD cannot be deployed. For related descriptions, refer to step S1306 in the embodiment shown in FIG. 13. Details are not described herein again.

It should be noted that, in this embodiment of this application, information 1 of a UPF network element or information 2 of a UPF network element, managed by an SMF network element, is configured on the NEF network element. When the NEF network element determines that the PFD information cannot be sent to some SMF network elements within the allowed delay, the NEF network element determines that the PFD information fails to be deployed on UPF network elements managed by these SMF network elements. This is uniformly described herein, and details are not described below again.

Optionally, in this embodiment of this application, the PFD report 2 may further include one or both of a cause value of a deployment failure of the PFD information or a PFD identifier corresponding to the PFD information that cannot be successfully deployed. The cause value of the deployment failure of the PFD information may be, for example, a communication fault.

Alternatively, in still another possible implementation, the PFD information management method provided in this embodiment of this application further includes the following steps S1405a/1405b to S1411.

S1405*a* and S1406*a* are the same as steps S1303*a* and S1304*a*. For related descriptions, refer to the embodiment shown in FIG. 13. Details are not described herein again.

S1405*b* and S1406*b* are the same as steps S1303*b* and S1304*b*. For related descriptions, refer to the embodiment shown in FIG. 13. Details are not described herein again.

S1407 to S1411 are the same as steps S1307 to S1311. For related descriptions, refer to the embodiment shown in FIG. 13. Details are not described herein again.

Further, in this embodiment of this application, after receiving the PFD report 2 or the PFD management response message 1, the application server may use, based on the information 2 that is of the UPF network element on which the PFD information cannot be deployed and that is carried in the PFD report 2 or the PFD management response message 1, for service data of users from the UPF network elements on which the PFD is not correctly deployed, corresponding configuration policies, for example, reducing fees of the users and playing common videos.

In addition, in the foregoing procedure, if the SMF network element learns of that the PFD corresponding to the application ID is not successfully deployed on some UPF network elements, these UPF network elements are not selected when a routing steering policy based on an application request is executed. This is uniformly described herein, and details are not described below again.

According to the PFD information management method provided in this embodiment of this application, after determining that the PFD information fails to be deployed on the UPF network element, the NEF network element may send, to the application server, the first indication information, the application ID corresponding to the PFD information, and the information 2 of the UPF network element on which the PFD cannot be deployed. Therefore, the application server can learn of information about the UPF network element on which the PFD information is not successfully deployed. Further, the application server may execute a corresponding policy on a service accessed by using the UPF network element. This avoids a problem in the prior art, that may affect user experience, caused by that the application server receives only a response indicating that all PFD information is successfully deployed or none of PFD information is successfully deployed, but cannot learn of a case in which a portion of PFD information fails to be deployed (for the case in which the portion of PFD information fails to be deployed, currently, the application server receives only a response message indicating that the portion of PFD information fails to be deployed).

The actions of the NEF network element in steps S1401 to S1411 may be performed by the processor 501 in the communications device 500 shown in FIG. 5 by invoking the application program code stored in the memory 503. This is not limited in this embodiment.

Figure 15:
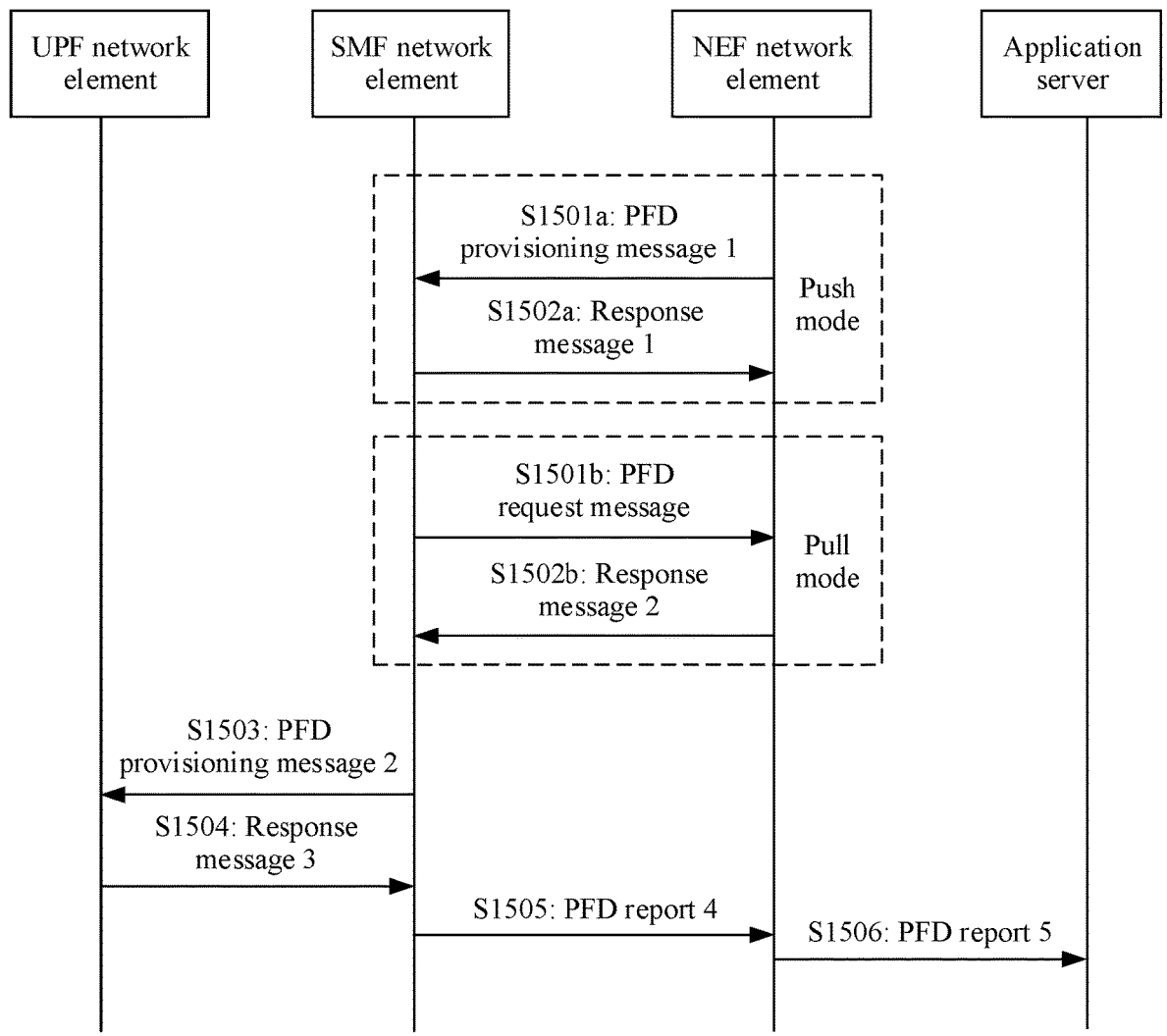
FIG. 15 is a schematic flowchart 10 of a PFD information management method according to an embodiment of this application.

Optionally, FIG. 15 describes a procedure in which after an error occurs in PFD deployment, an NEF is redeployed, and a success indication is sent to an application server by using the NEF network element in the procedure shown in FIG. 13 or FIG. 14. The procedure includes the following steps.

The NEF network element performs steps S1501*a* and S1502*a* or steps S1501*b* and S1502*b* on an SMF network element on which a PFD deployment error occurs.

S1501*a* and S1502*a* are the same as steps S1303*a* and S1304*a*. For related descriptions, refer to the embodiment shown in FIG. 13. Details are not described herein again.

S1501*b* and S1502*b* are the same as steps S1303*b* and S1304*b*. For related descriptions, refer to the embodiment shown in FIG. 13. Details are not described herein again.

In the embodiment shown in FIG. 13 or FIG. 14, if the UPF network element fails to deploy the PFD information, or an error occurs during execution of the UPF network element, or when the SMF network element receives the PFD information in steps S1501*a* and S1502*a* or steps S1501*b* and S1502*b*, the following steps S1503 and S1504 are performed.

S1503 and S1504 are the same as steps S1307 and S1308. For related descriptions, refer to the embodiment shown in FIG. 13. Details are not described herein again.

S1505: After determining that the PFD information is successfully deployed on the UPF network element, the SMF network element sends a PFD report 4 to the NEF network element. The NEF network element receives the PFD report 4 from the SMF network element.

The PFD report 4 carries second indication information, an application ID corresponding to the PFD information, and information 1 of the UPF network element on which the PFD information is successfully deployed, and the second indication information indicates that the PFD information is successfully deployed. For related descriptions of the information 1 of the UPF network element, refer to the embodiment shown in FIG. 13. Details are not described herein again.

Optionally, in this embodiment of this application, if the SMF network element determines that all PFD information is successfully deployed on the UPF network element, on which the PFD information fails to be deployed, managed by the SMF network element, the PFD report 4 may not carry the information 1 of the UPF network element on which the PFD information is successfully deployed.

Optionally, the PFD report 4 may further carry a PFD identifier corresponding to the successfully deployed PFD information.

S1506: The NEF network element sends a PFD report 5 to the application server, and the application server receives the PFD report 5 from the NEF network element.

The PFD report 5 carries the second indication information, the application ID corresponding to the PFD information, and information 2 of the UPF network element on which the PFD information is successfully deployed, and the second indication information indicates that the PFD information is successfully deployed. For related descriptions of the information 2 of the UPF network element, refer to the embodiment shown in FIG. 13. Details are not described herein again.

Optionally, in this embodiment of this application, if the SMF network element determines that all UPF network elements on which the PFD information fails to be deployed are successfully deployed, the PFD report 5 may not carry the information 2 of the UPF network element on which the PFD information is successfully deployed.

Optionally, the PFD report 5 may further carry the PFD identifier corresponding to the successfully deployed PFD information.

Further, in this embodiment of this application, after receiving the PFD report 5, the application server may use, based on the information 2 that is of the UPF network element on which the PFD information is successfully deployed and that is carried in the PFD report 5 or the foregoing information 2 of the UPF network element on which the PFD information fails to be deployed (that is, in a scenario in which the SMF network element or the NEF network element determines that all PFD information is successfully deployed on the UPF network element, on which the PFD information fails to be deployed, managed by the SMF network element or the NEF network element), for service data of users from the UPF network elements on which the PFD information has been correctly deployed, corresponding configuration policies, for example, increasing fees of the users and playing HD videos.

According to the PFD information management method provided in this embodiment of this application, after the SMF network element or the NEF network element determines that the PFD information is successfully deployed on the UPF network element, the application server can learn of information about the UPF network element on which the PFD information is successfully deployed. Further, the application server may execute a corresponding policy on a service accessed by using the UPF network element. For example, the user fees are increased, and the HD videos are played, thereby improving user experience.

The actions of the SMF or the NEF network element in steps S1501a to S1506 may be performed by the processor 501 in the communications device 500 shown in FIG. 5 by invoking the application program code stored in the memory 503. This is not limited in this embodiment.

It may be understood that, in the foregoing embodiments, the method and/or the steps implemented by the first network element may also be implemented by a component that can be used for the first network element.

The foregoing mainly describes the solutions provided in the embodiments of this application from a perspective of interaction between the network elements. Correspondingly, an embodiment of this application further provides a communications apparatus. The communications apparatus may be the first network element in the foregoing method embodiments, or an apparatus including the first network element, or a component that can be used for the first network element. It can be understood that, to implement the foregoing functions, the communications apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
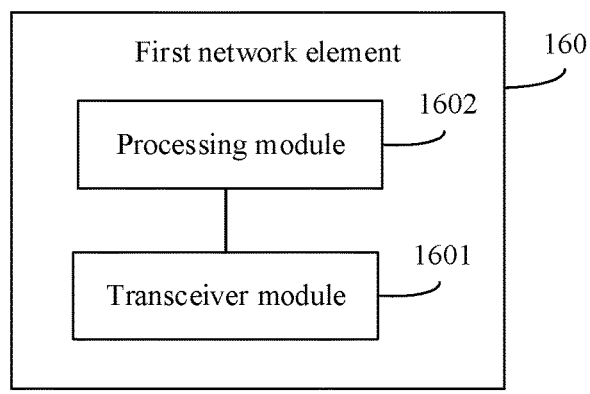
FIG. 16 is a schematic structural diagram of a first network element according to an embodiment of this application.

For example, an example in which the communications apparatus is the first network element in the foregoing method embodiment is used. FIG. 16 is a schematic structural diagram of a first network element 160. The first network element 160 includes a transceiver module 1601 and a processing module 1602. The transceiver module 1601 may also be referred to as a transceiver unit, and is configured to implement a transceiver function. For example, the transceiver module 1601 may be a transceiver circuit, a transceiver device, a transceiver, or a communications interface.

The processing module 1602 is configured to determine that PFD information fails to be deployed on a second network element. The transceiver module 1601 is configured to send a first message to a third network element, where the first message includes first indication information, an application ID corresponding to the PFD information, and first information of the second network element; the first information of the second network element is used to identify the second network element, and the first indication information indicates that the PFD information fails to be deployed.

In a possible implementation, the first network element 160 includes a packet flow description function network element, the second network element includes a policy and charging enforcement function network element or a service detection function network element, and the third network element includes a service capability exposure function network element.

Optionally, the processing module 1602 is specifically configured to: determine that the PFD information cannot be sent to the second network element within a configured period of time; or determine that the PFD information cannot be sent to the second network element within an allowed delay, where the allowed delay is duration of completing deployment of the PFD information; or receive a second message by using the transceiver module 1601, where the second message includes the first indication information and the application ID.

In another possible implementation, the first network element 160 includes a packet flow description function network element, the second network element includes a packet gateway user plane network element, and the third network element includes a service capability exposure function network element.

Optionally, the processing module 1602 is specifically configured to: determine that the PFD information cannot be sent to a packet gateway control plane network element within a configured period of time; or determine that the PFD information cannot be sent to the packet gateway control plane network element within an allowed delay, where the allowed delay is duration of completing deployment of the PFD information; or receive a second message by using the transceiver module 1601, where the second message includes the first indication information, the application ID, and the first information of the second network element.

In still another possible implementation, the first network element 160 includes a network exposure function network element, the second network element includes a user plane function network element, and the third network element includes an application server.

Optionally, the processing module 1602 is specifically configured to: determine that the PFD information cannot be sent to a session management network element within a configured period of time; or determine that the PFD information cannot be sent to the session management network element within an allowed delay, where the allowed delay is duration of completing deployment of the PFD information; or receive a second message by using the transceiver module 1601, where the second message includes the first indication information, the application ID, and second information of the second network element.

In still another possible implementation, the first network element 160 includes a service capability exposure function network element, the second network element includes a policy and charging enforcement function network element or a service detection function network element, and the third network element includes an application server; or the first network element 160 includes a service capability exposure function network element, the second network element includes a packet gateway user plane network element, and the third network element includes an application server.

Optionally, the processing module 1602 is specifically configured to: determine that the PFD information cannot be sent to a packet flow description function network element within a configured period of time; or determine that the PFD information cannot be sent to the packet flow description function network element within an allowed delay, where the allowed delay is duration of completing deployment of the PFD information; or receive a second message by using the transceiver module 1601, where the second message includes the first indication information, the application ID, and second information of the second network element.

In still another possible implementation, the first network element 160 includes a packet gateway control plane network element, the second network element includes a packet gateway user plane network element, and the third network element includes a packet flow description function network element; or the first network element 160 includes a session management network element, the second network element includes a user plane function network element, and the third network element includes a network exposure function network element.

Optionally, the processing module 1602 is specifically configured to: determine that the PFD information cannot be sent to the second network element within a configured period of time; or determine that the PFD information cannot be sent to the second network element within an allowed delay, where the allowed delay is duration of completing deployment of the PFD information; or receive a second message by using the transceiver module 1601, where the second message includes the first indication information, the application ID, and the first information of the second network element.

Optionally, the processing module 1602 is further configured to determine that the PFD information is successfully deployed on the second network element; and the transceiver module 1601 is further configured to send a third message to the third network element, where the third message includes second indication information, the application ID, and the first information of the second network element, and the second indication information indicates that the PFD information is successfully deployed.

Optionally, that the processing module 1602 is configured to determine that the PFD information is successfully deployed on the second network element includes: the processing module 1602 is configured to receive a fourth message by using the transceiver module 1601, where the fourth message includes the second indication information, the application ID, and the first information of the second network element.

All related content of the steps in the foregoing method embodiments may be cited in function descriptions of a corresponding function module, and details are not described herein again.

In this embodiment, the first network element 160 is presented in a form of functional modules obtained through division in an integrated manner. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the first network element 160 may be in a form of the communications device 500 shown in FIG. 5.

For example, the processor 501 in the communications device 500 shown in FIG. 5 may invoke the computer-executable instruction stored in the memory 503, so that the communications device 500 performs the PFD information management method in the foregoing method embodiments.

Specifically, functions/implementation processes of the transceiver module 1601 and the processing module 1602 in FIG. 16 may be implemented by the processor 501 in the communications device 500 shown in FIG. 5 by invoking the computer-executable instruction stored in the memory 503. Alternatively, a function/an implementation process of the processing module 1602 in FIG. 16 may be implemented by the processor 501 in the communications device 500 shown in FIG. 5 by invoking the computer-executable instruction stored in the memory 503, and a function/an implementation process of the transceiver module 1601 in FIG. 16 may be implemented by using the communications interface 504 in the communications device 500 shown in FIG. 5.

Because the first network element 160 provided in this embodiment may perform the foregoing PFD information management method, for a technical effect that can be achieved by the first network element 160, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of a computer program instruction, and is stored in a memory. A processor may be configured to execute the program instruction to implement the foregoing method procedures. The processor may be integrated in an SoC (system on chip) or an ASIC, or may be an independent semiconductor chip. In addition to a core configured to perform an operation or processing by executing a software instruction, the processor may further include a necessary hardware accelerator, for example, a field programmable gate array (FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communications apparatus (for example, the communications apparatus may be a chip or a chip system). The communications apparatus includes a processor, configured to implement the method in any one of the foregoing method embodiments. In a possible design, the communications apparatus further includes a memory. The memory is configured to store a necessary program instruction and necessary data. The processor may invoke program code stored in the memory, to instruct the communications apparatus to perform the method in any one of the foregoing method embodiments. Certainly, the communications apparatus may not include the memory. When the communications apparatus is a chip system, the communications apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, the disclosed content, and the accompanying claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and the accompanying drawings are merely example description of this application defined by the accompanying claims, and are considered as any of or all modifications, variations, combinations or equivalents that cover the scope of this application. Definitely, a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A packet flow description (PFD) information deployment management method comprising:
   determining, by a network exposure function network element, that PFD information fails to be deployed on a user plane function network element; and
   sending, by the network exposure function network element, a first message to an application server, wherein the first message comprises first indication information, an application ID corresponding to the PFD information, and first information of the user plane function network element, the first information of the user plane function network element identifies the user plane function network element on which the PFD information fails to be deployed, and the first indication information indicates that the PFD information fails to be deployed.

2. The method according to claim 1, wherein the step of determining comprises:
   determining, by the network exposure function network element, that the PFD information cannot be sent to a session management network element within an allowed duration of completing deployment of the PFD information.

3. The method according to claim 1, wherein after the step of sending the first message, the method further comprises:
   receiving, by the network exposure function network element, a fourth message, wherein the fourth message comprises second indication information and the application ID, and the second indication information indicates that the PFD information is successfully deployed on the user plane function network element; and
   sending, by the network exposure function network element, a third message to the application server, wherein the third message comprises the second indication information and the application ID.

4. The method according to claim 1, wherein the first information of the user plane function network element comprises:
   a routing area or tracking area identifier corresponding to the user plane function network element;
   a cell identifier corresponding to the user plane function network element;
   a data network access identifier corresponding to the user plane function network element;
   a geographic location corresponding to the user plane function network element; or
   a municipal address corresponding to the user plane function network element.

5. A network exposure function network element comprising:
   a memory storing executable instructions;
   a processor configured to execute the executable instructions to:
   determine that packet flow description (PFD) information fails to be deployed on a user plane function network element; and
   send a first message to an application server, wherein the first message comprises first indication information, an application ID corresponding to the PFD information, and first information of the user plane function network element; the first information of the user plane function network element identifies the user plane function network element on which the PFD information fails to be deployed, and the first indication information indicates that the PFD information fails to be deployed.

6. The network exposure function network element according to claim 5, wherein the processor is configured to determine that the PFD information fails to be deployed on the user plane function network element when the PFD information cannot be sent to the session management network element within an allowed duration of completing deployment of the PFD information.

7. The network exposure function network element according to claim 5, wherein the first information of the user plane function network element comprises:
   a routing area or tracking area identifier corresponding to the user plane function network element;

a cell identifier corresponding to the user plane function network element;
a data network access identifier corresponding to the user plane function network element;
a geographic location corresponding to the user plane function network element; or
a municipal address corresponding to the user plane function network element.

8. A communications system comprising:
a network exposure function network element; and
an application server;
wherein the network exposure function network element is configured to:
    determine that packet flow description (PFD) information fails to be deployed on a user plane function network element,
    send a first message to the application server, wherein the first message comprises first indication information, an application ID corresponding to the PFD information, and first information of the user plane function network element, the first information of the user plane function network element identifies the user plane function network element on which the PFD information fails to be deployed, and the first indication information indicates that the PFD information fails to be deployed on the user plane function network element; and
wherein the application server is configured to:
    receive the first message from the network exposure function network element.

9. The communications system according to claim 8, wherein the network exposure function network element is configured to determine that the PFD information fails to be deployed on the user plane function network element when the PFD information cannot be sent to the session management network element within an allowed duration for completing deployment of the PFD information.

10. The communications system according to claim 8, wherein the application server is further configured to:
    execute, according to the first indication information and the application ID, a policy on a service accessed by using the user plane function network element.

11. The communications system according to claim 8, wherein the first information of the user plane function network element comprises:
    a routing area or tracking area identifier corresponding to the user plane function network element;
    a cell identifier corresponding to the user plane function network element;
    a data network access identifier corresponding to the user plane function network element;
    a geographic location corresponding to the user plane function network element; or
    a municipal address corresponding to the user plane function network element.

12. A packet flow description (PFD) information deployment management method comprising:
    determining, by a network exposure function network element, that PFD information fails to be deployed on a user plane function network element;
    sending, by the network exposure function network element, a first message to an application server, wherein the first message comprises first indication information, an application ID corresponding to the PFD information, and first information of the user plane function network element; the first information of the user plane function network element identifies the user plane function network element on which the PFD information fails to be deployed and the first indication information indicates that the PFD information fails to be deployed; and
    receiving, by the application server, the first message from the network exposure function network element.

13. The method according to claim 12, wherein the step of determining comprises:
    determining, by the network exposure function network element, that the PFD information cannot be sent to a session management network element within an allowed duration of completing deployment of the PFD information.

14. The method according to claim 12, wherein the first information of the user plane function network element comprises:
    a routing area or tracking area identifier corresponding to the user plane function network element;
    a cell identifier corresponding to the user plane function network element;
    a data network access identifier corresponding to the user plane function network element;
    a geographic location corresponding to the user plane function network element; or
    a municipal address corresponding to the user plane function network element.

* * * * *